US011962359B2

(12) United States Patent
Abedini et al.

(10) Patent No.: US 11,962,359 B2
(45) Date of Patent: Apr. 16, 2024

(54) DETECTION OF DEPLOYED TIME-DOMAIN DUPLEXED REPEATERS

(71) Applicant: QUALCOMM Incorporated, San Diego, CA (US)

(72) Inventors: Navid Abedini, Basking Ridge, NJ (US); Junyi Li, Franklin Park, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 332 days.

(21) Appl. No.: 17/317,595

(22) Filed: May 11, 2021

(65) Prior Publication Data

US 2022/0368437 A1    Nov. 17, 2022

(51) Int. Cl.
*H04B 17/309* (2015.01)
*H04B 7/15* (2006.01)
*H04L 5/00* (2006.01)
*H04L 5/14* (2006.01)
*H04L 43/16* (2022.01)
*H04W 52/24* (2009.01)

(52) U.S. Cl.
CPC ............. *H04B 17/309* (2015.01); *H04B 7/15* (2013.01); *H04L 5/0048* (2013.01); *H04L 5/14* (2013.01); *H04L 43/16* (2013.01); *H04W 52/241* (2013.01)

(58) Field of Classification Search
CPC ....................................................... H04B 7/15
See application file for complete search history.

(56) References Cited

U.S. PATENT DOCUMENTS

| 10,543,808 | B2* | 1/2020 | Lin .................... G07C 9/00309 |
| 2005/0266802 | A1 | 12/2005 | Wolf et al. |
| 2019/0143942 | A1* | 5/2019 | Neuhoff ............. G07C 9/00309 340/5.72 |
| 2020/0005571 | A1* | 1/2020 | Han ...................... B60R 25/245 |
| 2022/0417752 | A1* | 12/2022 | Mori ....................... B60R 25/24 |

FOREIGN PATENT DOCUMENTS

JP           2012144905 A       8/2012

OTHER PUBLICATIONS

International Search Report and Written Opinion—PCT/US2022/071301—ISA/EPO—dated Jul. 7, 2022.

* cited by examiner

*Primary Examiner* — Joseph A Bednash
(74) *Attorney, Agent, or Firm* — ArentFox Schiff LLP

(57) ABSTRACT

Example aspects include a method, apparatus, and computer-readable medium for detecting a repeater on a propagation path at a transmitting device of a wireless communication network, comprising receiving a repeater detection configuration indicating a detection threshold and at least one transmit power level. The aspects further include transmitting a first signal at a first power level. Additionally, the aspects include receiving first measurement results of the first signal. Additionally, the aspects include transmitting a second signal at a second power level. The second power level being different than the first power level. Additionally, the aspects include receiving second measurement results of the second signal. Additionally, the aspects include detecting an active repeater on the propagation path in response to a difference between the first measurement results and the second measurement results satisfying the detection threshold.

18 Claims, 20 Drawing Sheets

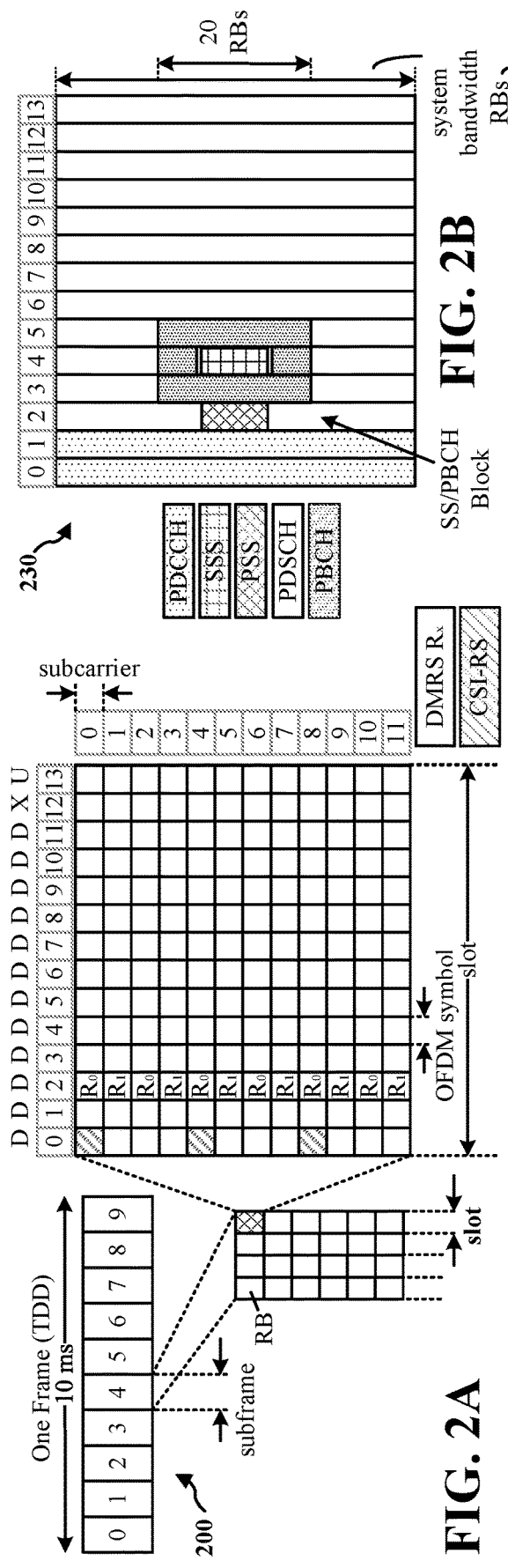
FIG. 2A
FIG. 2B
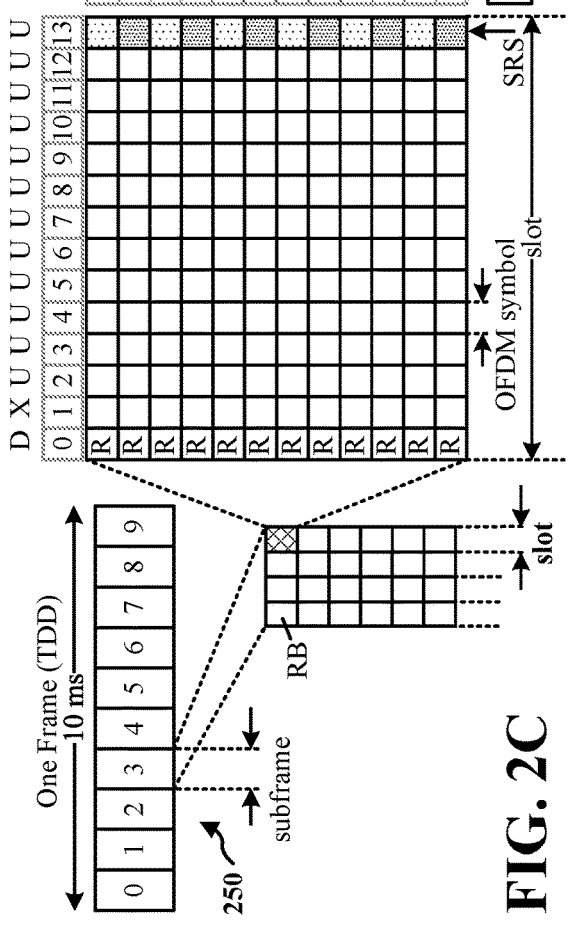
FIG. 2C
FIG. 2D

DETECTION OF DEPLOYED TIME-DOMAIN DUPLEXED REPEATERS

BACKGROUND

Technical Field

The described aspects relate generally to wireless communication systems, and more particularly, to apparatuses and methods for detecting a time-domain duplexed (TDD) repeater on a propagation path.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may deploy repeaters to improve performance of the wireless communication network. In some aspects, the repeaters may be deployed and configured to transparently improve the performance of at least one network node, without intervention from the wireless communication network. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of detecting a repeater on a propagation path at a transmitting device of a wireless communication network, comprising receiving, from a controlling entity, a repeater detection configuration indicating a detection threshold and at least one transmit power level. The method further includes transmitting, to a receiving device via the propagation path and according to the repeater detection configuration, a first signal at a first power level. Additionally, the method includes receiving, in response to transmitting the first signal, first measurement results of the first signal. Additionally, the method includes transmitting, to the receiving device via the propagation path and according to the repeater detection configuration, a second signal at a second power level. The second power level is different than the first power level. Additionally, the method includes receiving, in response to transmitting the second signal, second measurement results of the second signal. Additionally, the method includes detecting an active repeater on the propagation path in response to a difference between the first measurement results and the second measurement results satisfying the detection threshold.

Another example aspect includes an apparatus for detecting a repeater on a propagation path at a transmitting device of a wireless communication network, comprising a memory storing instructions, and a processor communicatively coupled with the memory and configured to execute the instructions to receive, from a controlling entity, a repeater detection configuration indicating a detection threshold and at least one transmit power level. The processor is further configured to execute the instructions to transmit, to a receiving device via the propagation path and according to the repeater detection configuration, a first signal at a first power level. Additionally, the processor is further configured to execute the instructions to receive, in response to transmitting the first signal, first measurement results of the first signal. Additionally, the processor is further configured to execute the instructions to transmit, to the receiving device via the propagation path and according to the repeater detection configuration, a second signal at a second power level. The second power level is different than the first power level. Additionally, the processor is further configured to execute the instructions to receive, in response to transmitting the second signal, second measurement results of the second signal. Additionally, the processor is further configured to execute the instructions to detect an active repeater on the propagation path in response to a difference between the first measurement results and the second measurement results satisfying the detection threshold.

Another example aspect includes an apparatus for detecting a repeater on a propagation path at a transmitting device of a wireless communication network, comprising means for receiving, from a controlling entity, a repeater detection configuration indicating a detection threshold and at least one transmit power level. The apparatus further includes means for transmitting, to a receiving device via the propagation path and according to the repeater detection configuration, a first signal at a first power level. Additionally, the apparatus further includes means for receiving, in response to transmitting the first signal, first measurement results of the first signal. Additionally, the apparatus further includes means for transmitting, to the receiving device via the propagation path and according to the repeater detection configuration, a second signal at a second power level. The second power level is different than the first power level.

Additionally, the apparatus further includes means for receiving, in response to transmitting the second signal, second measurement results of the second signal. Additionally, the apparatus further includes means for detecting an active repeater on the propagation path in response to a difference between the first measurement results and the second measurement results satisfying the detection threshold.

Another example aspect includes a computer-readable medium (e.g., non-transitory computer-readable medium) storing instructions for detecting a repeater on a propagation path at a transmitting device of a wireless communication network, executable by a processor, to receive, from a controlling entity, a repeater detection configuration indicating a detection threshold and at least one transmit power level. The instructions are further executable to transmit, to a receiving device via the propagation path and according to the repeater detection configuration, a first signal at a first power level. Additionally, the instructions are further executable to receive, in response to transmitting the first signal, first measurement results of the first signal. Additionally, the instructions are further executable to transmit, to the receiving device via the propagation path and according to the repeater detection configuration, a second signal at a second power level. The second power level is different than the first power level. Additionally, the instructions are further executable to receive, in response to transmitting the second signal, second measurement results of the second signal. Additionally, the instructions are further executable to detect an active repeater on the propagation path in response to a difference between the first measurement results and the second measurement results satisfying the detection threshold.

Another example aspect includes a method of detecting a repeater on a propagation path at a receiving device of a wireless communication network, comprising receiving, from a controlling entity, a repeater detection configuration indicating at least a detection threshold. The method further includes receiving, from a transmitting device via the propagation path, a first signal having been transmitted at a first power level indicated by the repeater detection configuration. Additionally, the method includes performing first measurements of the first signal resulting in first measurement results. Additionally, the method includes receiving, from the transmitting device via the propagation path, a second signal having been transmitted at a second power level indicated by the repeater detection configuration. Additionally, the method includes performing second measurements of the second signal resulting in second measurement results. Additionally, the method includes detecting an active repeater on the propagation path in response to a difference between the first measurement results and the second measurement results satisfying the detection threshold.

Another example aspect includes an apparatus for detecting a repeater on a propagation path at a receiving device of a wireless communication network, comprising a memory storing instructions, and a processor communicatively coupled with the memory and configured to execute the instructions to receive, from a controlling entity, a repeater detection configuration indicating at least a detection threshold. The processor is further configured to execute the instructions to receive, from a transmitting device via the propagation path, a first signal having been transmitted at a first power level indicated by the repeater detection configuration. Additionally, the processor is further configured to execute the instructions to perform first measurements of the first signal resulting in first measurement results. Additionally, the processor is further configured to execute the instructions to receive, from the transmitting device via the propagation path, a second signal having been transmitted at a second power level indicated by the repeater detection configuration. Additionally, the processor is further configured to execute the instructions to perform second measurements of the second signal resulting in second measurement results. Additionally, the processor is further configured to execute the instructions to detect an active repeater on the propagation path in response to a difference between the first measurement results and the second measurement results satisfying the detection threshold.

Another example aspect includes an apparatus for detecting a repeater on a propagation path at a receiving device of a wireless communication network, comprising means for receiving, from a controlling entity, a repeater detection configuration indicating at least a detection threshold. The apparatus further includes means for receiving, from a transmitting device via the propagation path, a first signal having been transmitted at a first power level indicated by the repeater detection configuration. Additionally, the apparatus further includes means for performing first measurements of the first signal resulting in first measurement results. Additionally, the apparatus further includes means for receiving, from the transmitting device via the propagation path, a second signal having been transmitted at a second power level indicated by the repeater detection configuration. Additionally, the apparatus further includes means for performing second measurements of the second signal resulting in second measurement results. Additionally, the apparatus further includes means for detecting an active repeater on the propagation path in response to a difference between the first measurement results and the second measurement results satisfying the detection threshold.

Another example aspect includes a computer-readable medium (e.g., non-transitory computer-readable medium) storing instructions for detecting a repeater on a propagation path at a receiving device of a wireless communication network, executable by a processor, to receive, from a transmitting device via the propagation path, a first signal having been transmitted at a first power level indicated by the repeater detection configuration. The instructions are further executable to perform first measurements of the first signal resulting in first measurement results. Additionally, the instructions are further executable to receive, from the transmitting device via the propagation path, a second signal having been transmitted at a second power level indicated by the repeater detection configuration. Additionally, the instructions are further executable to perform second measurements of the second signal resulting in second measurement results. Additionally, the instructions are further executable to detect an active repeater on the propagation path in response to a difference between the first measurement results and the second measurement results satisfying the detection threshold.

Another example aspect includes a method of detecting a repeater on a propagation path at a controlling entity of a wireless communication network, comprising transmitting a repeater detection configuration indicating a detection threshold and at least one transmit power level. The method further includes receiving first measurement results of a first signal transmitted, via the propagation path, at a first power level indicated by the repeater detection configuration. Additionally, the method includes receiving second measurement results of a second signal transmitted, via the propagation path, at a second power level indicated by the repeater detection configuration. Additionally, the method includes detecting an active repeater on the propagation path in response to a difference between the first measurement results and the second measurement results satisfying the detection threshold.

Another example aspect includes an apparatus for detecting a repeater on a propagation path at a controlling entity of a wireless communication network, comprising a memory storing instructions, and a processor communicatively coupled with the memory and configured to execute the instructions to transmit a repeater detection configuration indicating a detection threshold and at least one transmit power level. The processor is further configured to execute the instructions to receive first measurement results of a first signal transmitted, via the propagation path, at a first power level indicated by the repeater detection configuration. Additionally, the processor is further configured to execute the instructions to receive second measurement results of a second signal transmitted, via the propagation path, at a second power level indicated by the repeater detection configuration. Additionally, the processor is further configured to execute the instructions to detect an active repeater on the propagation path in response to a difference between the first measurement results and the second measurement results satisfying the detection threshold.

Another example aspect includes an apparatus for detecting a repeater on a propagation path at a controlling entity of a wireless communication network, comprising means for transmitting a repeater detection configuration indicating a detection threshold and at least one transmit power level. The apparatus further includes means for receiving first measurement results of a first signal transmitted, via the propagation path, at a first power level indicated by the repeater detection configuration. Additionally, the apparatus further includes means for receiving second measurement results of a second signal transmitted, via the propagation path, at a second power level indicated by the repeater detection configuration. Additionally, the apparatus further includes means for detecting an active repeater on the propagation path in response to a difference between the first measurement results and the second measurement results satisfying the detection threshold.

Another example aspect includes a computer-readable medium (e.g., non-transitory computer-readable medium) storing instructions for detecting a repeater on a propagation path at a controlling entity of a wireless communication network, executable by a processor, to transmit a repeater detection configuration indicating a detection threshold and at least one transmit power level. The instructions are further executable to receive first measurement results of a first signal transmitted, via the propagation path, at a first power level indicated by the repeater detection configuration. Additionally, the instructions are further executable to receive second measurement results of a second signal transmitted, via the propagation path, at a second power level indicated by the repeater detection configuration. Additionally, the instructions are further executable to detect an active repeater on the propagation path in response to a difference between the first measurement results and the second measurement results satisfying the detection threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
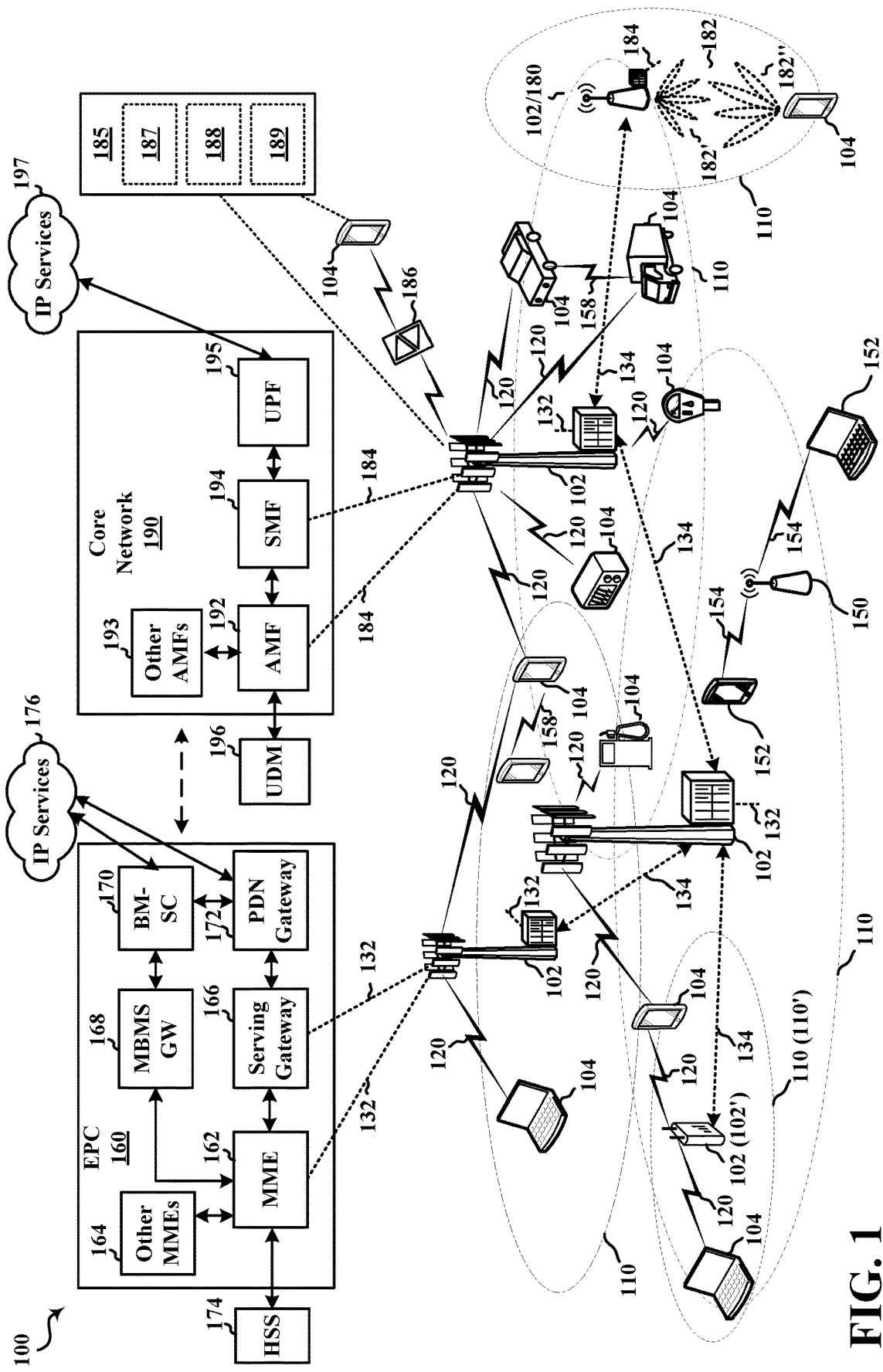
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may deploy repeaters to improve performance of the wireless communication network, such as extending the coverage of a network node (e.g., base station) and/or providing an alternative propagation path around an obstruction and/or blockage (e.g., building, tree, change in elevation of the terrain). In some aspects, the repeaters may be configured to transparently improve the performance of the wireless communication network. That is, the repeaters may be configured to operate without intervention from the wireless communication network. However, in some aspects, performance of the wireless communication network may be further improved if or when the network node is aware of the presence of a repeater in the propagation path.

Aspects presented herein provide for multiple manners for detecting a repeater in the propagation path of a device. In some aspects, the repeater may be detected by a transmitting device and/or a receiving device. Further, aspects presented herein may improve performance of wireless communication devices, when compared to a conventional communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base stations 102 and/or the UE 104 may include a repeater detection component 185 configured to detect a presence of a repeater 186 in a propagation path (e.g., receive channel or transmit channel) of the corresponding device. The repeater detection component 185 may include a set of components, such as a transmit (TX) repeater detection component 187, a receive (RX) repeater detection component 188, and/or a controlling repeater detection component 189. For example, the TX repeater detection component 187 may be configured to receive a repeater detection configuration, transmit a first signal at a first power level and transmit a second signal at a second power level, and detect an active repeater 186 on the propagation path. The RX repeater detection component 188 may be configured to receive a first signal having been transmitted at a first power level, receive a second signal having been transmitted at a second power level, perform measurements on the first signal and the second signal, and detect an active repeater 186 on the propagation path. The controlling repeater detection component 189 may be configured to transmit a repeater detection configuration, receive first measurement results and second measurement results, and detect an active repeater 186 on the propagation path.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
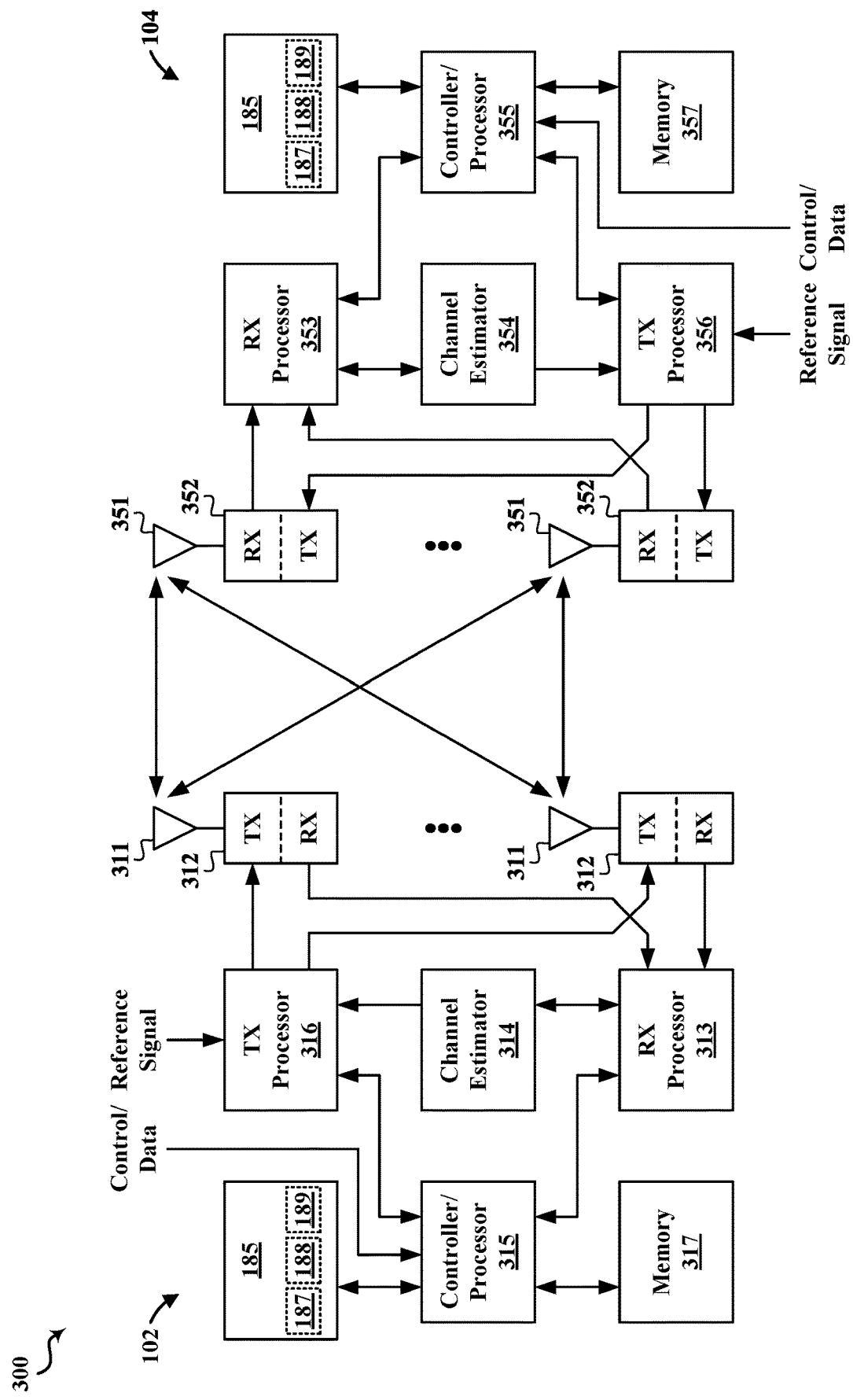
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 and/or the UE 104 may include the repeater detection component 185 configured to detect a presence of a repeater 186 in a propagation path (e.g., receive channel or transmit channel) of the corresponding device. The repeater detection component 185 may include a set of components, such as a transmit (TX) repeater detection component 187, a receive (RX) repeater detection component 188, and/or a controlling repeater detection component 189. For example, the TX repeater detection component 187 may be configured to receive a repeater detection configuration, transmit a first signal at a first power level and transmit a second signal at a second power level, and detect an active repeater 186 on the propagation path. The RX repeater detection component 188 may be configured to receive a first signal having been transmitted at a first power level, receive a second signal having been transmitted at a second power level, perform measurements on the first signal and the second signal, and detect an active repeater 186 on the propagation path. The controlling repeater detection component 189 may be configured to transmit a repeater detection configuration, receive first measurement results and second measurement results, and detect an active repeater 186 on the propagation path.

In other aspects, at least one of the TX processor 316, the RX processor 313, and the controller/processor 315 may be configured to perform aspects in connection with the repeater detection component 185 of FIG. 1 (e.g., the TX repeater detection component 187, the RX repeater detection component 188, and/or the controlling repeater detection component 189). For example, the memory 317 may store computer-executable instructions defining the repeater detection component 185 (e.g., the TX repeater detection component 187, the RX repeater detection component 188, and/or the controlling repeater detection component 189). In other aspects, the TX processor 316, the RX processor 313, and/or the controller/processor 315 may be configured to execute the repeater detection component 185 (e.g., the TX repeater detection component 187, the RX repeater detection component 188, and/or the controlling repeater detection component 189).

In other aspects, at least one of the TX processor 356, the RX processor 353, and the controller/processor 355 may be configured to perform aspects in connection with the repeater detection component 185 of FIG. 1 (e.g., the TX repeater detection component 187, the RX repeater detection component 188, and/or the controlling repeater detection component 189). For example, the memory 357 may store computer-executable instructions defining the repeater detection component 185 (e.g., the TX repeater detection component 187, the RX repeater detection component 188, and/or the controlling repeater detection component 189). In other aspects, the TX processor 356, the RX processor 353, and/or the controller/processor 355 may be configured to execute the repeater detection component 185 (e.g., the TX repeater detection component 187, the RX repeater detection component 188, and/or the controlling repeater detection component 189).

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Conventional wireless communication systems may deploy repeaters to improve performance of the wireless communication network. For example, repeaters may be deployed to address signal quality degradations within a coverage area of the network. Alternatively or additionally, the repeaters may be deployed to provide an alternative propagation path around an obstruction and/or blockage (e.g., building, tree, change in elevation of the terrain). In some aspects, the repeaters may comprise a relay node configured to perform amplify-and-forward operations between two wireless nodes (e.g., gNB, base station, UE). In other aspects, the repeaters may be configured to perform decode-and-forward operations (e.g., an integrated access and backhaul (IAB) node). That is, the repeaters may receive wireless signals transmitted over the air by a transmitter (e.g., gNB, base station, UE), amplify the wireless signals, and transmit (e.g., forward) the amplified wireless signals in another direction. Such types of repeaters may generally be referred to as "analog repeaters" or "traditional repeaters." Conventionally, traditional repeaters may perform minimal processing (e.g., digital processing) on the wireless signals other than the analog amplification and forwarding of the received wireless signals.

In some aspects, traditional repeaters may be deployed at predetermined locations with a predetermined configuration according to analysis performed by network operators. For example, a network operator may determine locations and/or initial configurations for traditional repeaters based on one or more coverage issues (e.g., low signal quality, blockage) within the wireless communication network. Once deployed, the conventional traditional repeaters may operate according to the initial configuration and may not be reconfigured remotely (e.g., using remote signaling) and/or dynamically if or when network conditions change. Thus, the ability to dynamically reconfigure a repeater may be desirable.

For example, a repeater may be provided with side information to change configuration and/or parameters of the repeater in a manner that may improve the performance of the repeater. In some aspects, the side information may include spatial information for beam management. That is, the repeater may use the spatial information to perform beamforming on the signals received and/or transmitted by the repeater. For example, the repeater, based on the spatial information, may form one or more receive and/or transmit beams for receiving and/or transmitting the wireless signals. In other aspects, the side information may include on/off scheduling information that may indicate one or more periods of time during which the repeater may operate in a low-power mode and/or power down (e.g., turn off) at least a portion of the repeater circuitry. Alternatively or additionally, the side information may include time-domain duplexed (TDD) uplink/downlink configuration information and/or timing information (e.g., boundaries for slots, symbols, subframes, and/or frames) that the repeater may use to synchronize reception and/or transmission of the wireless signals with the wireless communication network.

A repeater capable of being dynamically reconfigured (e.g., with the side information) may generally be referred to as a "smart repeater." In some aspects, a smart repeater may be implemented as an autonomous smart repeater. For example, an autonomous smart repeater may decode at least a portion of the received wireless signals to acquire and/or infer at least a portion of the side information. For example, the autonomous smart repeater may obtain (e.g., acquire) the side information by receiving and decoding one or more broadcast channels. Alternatively or additionally, the autonomous smart repeater may infer at least a portion of the side information based on other information acquired from the received wireless signals. In other aspects, a smart repeater may be implemented as a network-controlled smart repeater. For example, the network-controlled smart repeater may be configured and/or controlled with side information provided by a network node (e.g., gNB, base station) via an established control interface. Alternatively or additionally, the network-controlled smart repeater may receive a portion of the side information from the network node and may obtain another portion of the side information by decoding at least a portion of the received wireless signals (e.g., similar to the autonomous smart repeater).

In some aspects, the traditional repeaters and the autonomous smart repeaters may be deployed in a transparent manner on the wireless communication network. That is, the traditional repeaters and the autonomous smart repeaters may be deployed to transparently improve the performance of at least one network node (e.g., gNB, base station, UE), without intervention from the wireless communication network. In some aspects, the configuration of the traditional repeaters and the autonomous smart repeaters may be manually set at the time of deployment to achieve a desired performance. The initial configuration of the autonomous smart repeaters may be less important because the autonomous smart repeaters may automatically and/or dynamically reconfigure based on side information obtained from one or more broadcast channels. For example, an autonomous smart repeater may be deployed on a moving object (e.g., public transportation vehicle, ride-sharing vehicle, drone), and, as such, an initial configuration may not remain valid after the initial deployment and the autonomous smart repeater may need to rely on the side information acquired and/or inferred from the received wireless signals to update the configuration of the repeater.

In some aspects, a configuration of the autonomous smart repeaters may be described in one or more regulations and/or standards (e.g., 3GPP).

Figure 4:
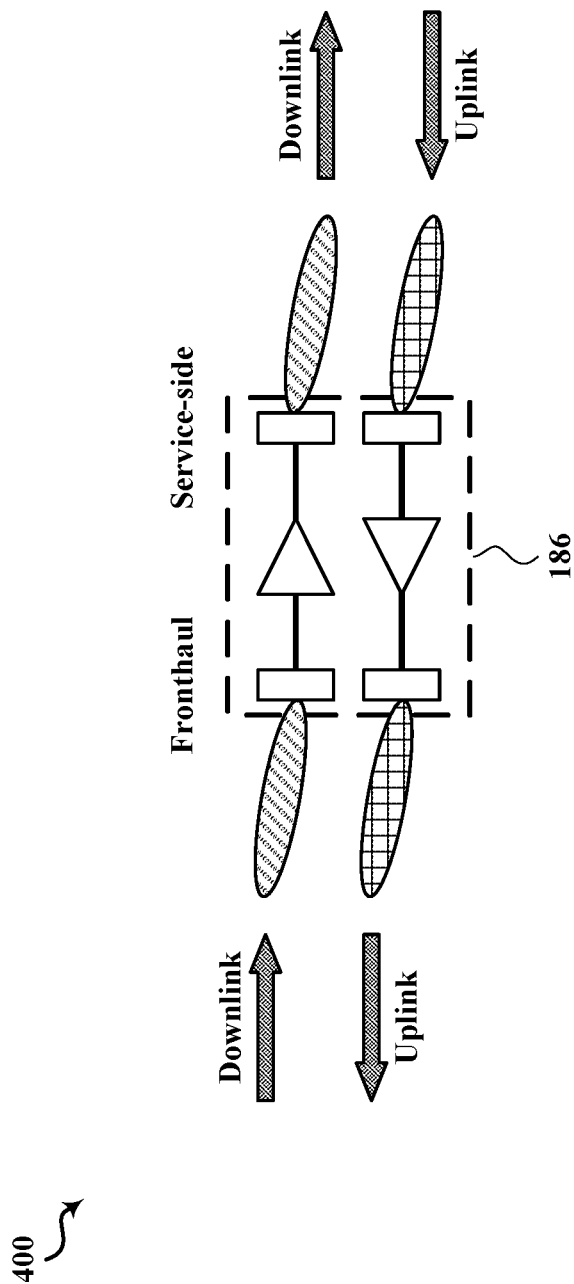
FIG. 4 is a diagram illustrating an example of a repeater, in accordance with various aspects of the present disclosure.

FIG. 4 illustrates a diagram 400 of an example of a repeater 186. In some aspects, the repeater 186 may be similar in many respects to the traditional repeater or to the autonomous smart repeater as described above, and may include additional features not mentioned above. In other optional or additional aspects, the repeater 186 may comprise an active reflector. The aspects presented herein are not limited in this regard, and may be used with other types of repeaters. Notably, the aspects presented herein may be employed with any repeater that amplifies a received signal prior to forwarding the amplified signal and/or performs full-duplex communication operations (e.g., transmitting and receiving simultaneously).

The repeater 186 may comprise multiple antenna arrays and/or multiple amplification chains (e.g., RF, intermediate frequency (IF)). In some aspects, the repeater 186 may be capable of simultaneously forwarding signals in two or more directions. For example, the repeater 186 may be able to perform simultaneous uplink (e.g., fronthaul) forwarding and downlink (e.g., service-side) forwarding. That is, the repeater 186 may receive a downlink signal (e.g., from a gNB or base station) using an antenna array and a beam on the fronthaul side of the repeater 186, amplify the downlink signal, and forward the amplified downlink signal using another antenna array and beam on the service-side of the repeater 186. Alternatively or additionally, the repeater 186 may receive an uplink signal (e.g., from a UE) using an antenna array and a beam on the service-side side of the repeater 186, amplify the uplink signal, and forward the amplified uplink signal using another antenna array and beam on the fronthaul side of the repeater 186. As such, the repeater 186 may support full-duplex communications between two network devices (e.g., gNB, base station, UE) and/or two or more network devices (e.g., another repeater) that may be independently transmitting signals simultaneously.

In some aspects, the repeater 186 may not be aware of the TDD uplink/downlink configuration of a wireless communication network (e.g., access network 100). For example, the repeater 186 may not have an indication of whether the current slot is configured as a downlink slot or as an uplink slot, and thus, the repeater 186 may not be able to determine a correct forwarding direction. In such aspects, the repeater 186 may be configured to forward received signals in both directions (e.g., downlink/uplink, fronthaul/service-side) to reduce the likelihood of a loss of data.

In other optional or additional aspects, the repeater 186 may be deployed in a transparent manner on the wireless communication network. That is, the wireless communication network may not be aware of the existence, location, and/or configuration of the repeater 186. That is, the repeater 186 may be configured to operate without intervention from the wireless communication network. However, in some aspects, performance of the wireless communication network may be further improved if or when network devices in the vicinity of the repeater 186 may be aware of the presence of the repeater 186 in the propagation path.

In other aspects, the bidirectional forwarding operation of the repeater 186 may cause one or more interference signals to be added to a forwarded signal. For example, the repeater 186 may, under certain channel conditions, add large-delay self-interference (SI) and/or cross-link interference (CLI) to one or more of the signals received and forwarded by the repeater 186. That is, these interference signals may only be present due to the presence of the repeater 186 in the propagation path, and may not be expected to be present if or when the repeater 186 is not part of the propagation path. In addition, the interference signals forwarded by the repeater 186 (e.g., caused by the repeater 186) may travel via multiple wireless links and/or components, and, as such, may be received by an intended receiving device after a relatively long delay when compared to other interference signal delays (e.g., not cause by the repeater 186). That is, a delay (e.g., latency) of these interference signals may be substantially larger than a delay of an interfering signal received directly from a transmitting device.

Figure 5:
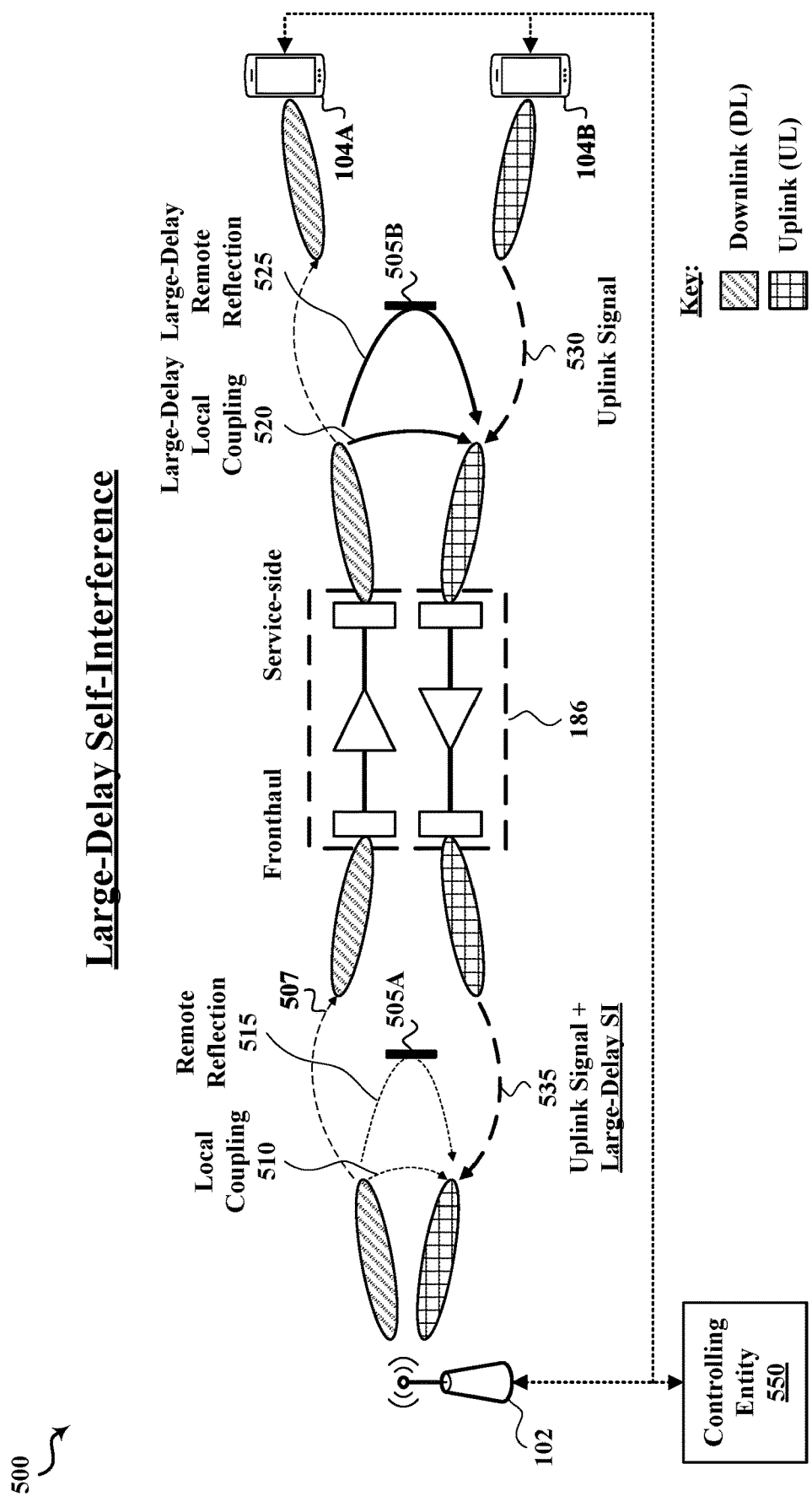
FIG. 5 is a diagram illustrating an example of large delay self-interference, in accordance with various aspects of the present disclosure.

FIG. 5 is a diagram illustrating an example of a wireless communication system 500. The wireless communication system 500 may comprise a network device 102 (e.g., base station, distributed unit (DU), transmission and reception point (TRP)), UEs 104A-B, and a repeater 186. The architecture of the wireless communication system 500 depicted in FIG. 5 may be similar in many respects to the architecture of the wireless communication system 100 described above in reference to FIG. 1, and may include additional features not mentioned above. Some of the elements of the wireless communication system 100 described above have been omitted for the sake of simplicity. The network device 102 and the UEs 104A-B may include a TX repeater detection component 187, a RX repeater detection component 188, and/or a controlling repeater detection component 189.

The network device 102 may be configured to perform full-duplex communication operations. For example, the network device 102 may transmit, via a downlink beam of an antenna array, a downlink signal 507 to a device (e.g., UE 104A) while simultaneously receiving, via an uplink beam of another antenna array, an uplink signal 530 from another device (e.g., UE 104B). In some aspects, the network device 102 performing the full-duplex communication operations may receive, via the uplink beam, the uplink signal 530 from the UE 104B, comprising a portion of the downlink signal 507 transmitted, via the downlink beam, by the network device 102. The portion of the downlink signal 507 that is received by the network device 102 may generally be referred to as self-interference (SI).

In some aspects, the SI may be caused by local coupling 510 between the antenna ports of the network device 102. That is, RF components of the transmit antenna ports and of the receive antenna ports may couple with each other (e.g., due to a physical proximity) and the portion of the downlink signal 507 may leak into the receive antenna ports through the coupling. As such, the SI caused by the local coupling 510 may be received practically simultaneously with the transmission of the downlink signal 507.

Alternatively or additionally, the SI may be caused by remote reflections 515 (e.g., clutter echo) of the transmitted downlink signal 507 from random objects (e.g., 505A-B) in the transmission environment. For example, the network device 102 may receive, via the uplink beam, the remote reflections 515 of the downlink signal 507 after traveling to and from the object 505A. As such, the SI caused by the remote reflections 515 may be received after a short (e.g., small) time period (e.g., delay) has elapsed from the transmission of the downlink signal 507. That is, a local coupling signal 510 of the SI and a remote reflection signal 515 of the SI may be differentiated according to a receive latency (e.g., delay) associated with each signal.

Continuing to refer to FIG. 5, the propagation paths between the network device 102 and the UEs 104A-B may include the repeater 186. That is, the repeater 186 may be configured to receive the downlink signal 507 from network device 102 and forward an amplified downlink signal to the UE 104A. Alternatively or additionally, the repeater 186 may be configured to receive the uplink signal 530 from UE 104B and forward an amplified uplink signal 535 to the network device 102. That is, a service-side of the repeater 186 may be simultaneously transmitting (e.g., forwarding) the downlink signal 507 to the UE 104A and receiving the uplink signal 530 from the UE 104B. As such, the service-side of the repeater 186 may perform full-duplex communication operations in a manner similar to the network device 102. As a result, the service-side of the repeater 186 may add large-delay SI signals (e.g., local coupling 520, remote reflection 525) to the uplink signal 530 in a manner similar to the network device 102. That is, the large-delay SI signals 520, 525 may differ from the SI signals 510, 515 of the network device 102 in that the large-delay SI signals 520, 525 may be associated with a significantly larger delay (e.g., latency) than the SI signals 510, 515 of the network device 102. For example, a propagation path of the large-delay SI signals 520, 525 may be significantly longer than the propagation path of the SI signals 510, 515 of the network device 102.

Alternatively or additionally, the repeater 186 may amplify the uplink signal 535, that may comprise the large-delay SI signals 520, 525, prior to transmitting (e.g., forward) the amplified uplink signal 535 to the network device 102. Thus, the network device 102 may receive, via the uplink beam, the uplink signal 535 which may be combined with the SI signals 510, 515 of the network device 102 and the large-delay SI signals 520, 525 of the repeater 186.

Figure 6:
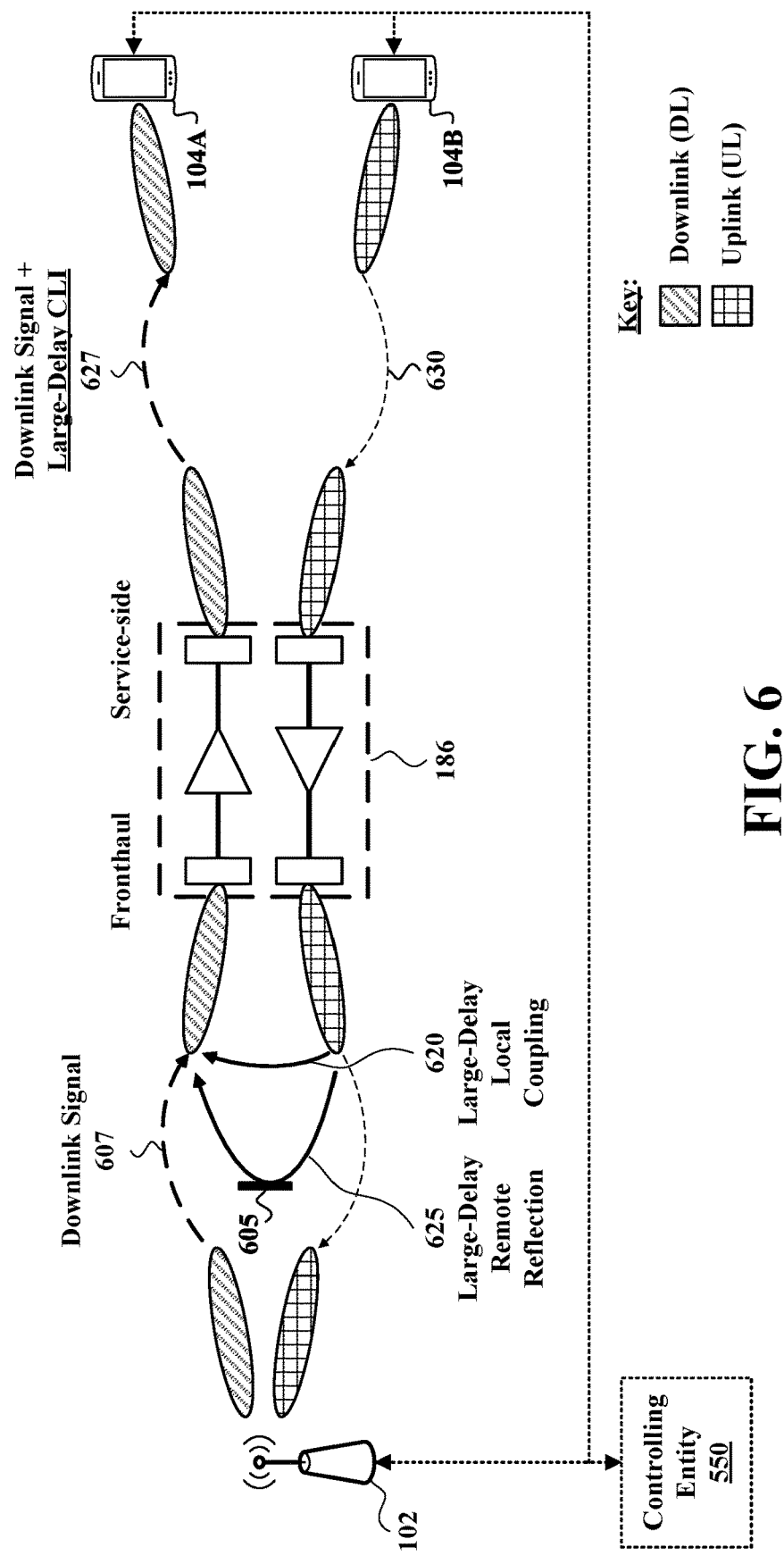
FIG. 6 is a diagram illustrating an example of cross-link interference, in accordance with various aspects of the present disclosure.

FIG. 6 is a diagram illustrating an example of a wireless communication system 600. The wireless communication system 600 may comprise a network device 102 (e.g., base station, DU, TRP), UEs 104A-B, and a repeater 186. The architecture of the wireless communication system 600 depicted in FIG. 6 may be similar in many respects to the architecture of the wireless communication systems 100 and 500 described above in reference to FIGS. 1 and 5, and may include additional features not mentioned above. Some of the elements of the wireless communication systems 100 and 500 described above have been omitted for the sake of simplicity. The network device 102 and the UEs 104A-B may include the TX repeater detection component 187, the RX repeater detection component 188, and/or the controlling repeater detection component 189.

The network device 102 and the repeater 186 may be configured to perform full-duplex communication operations in a similar manner as described above in reference to FIG. 5. For example, the network device 102 may be configured to simultaneously transmit, via a downlink beam, the downlink signal 607 to the UE 104A and receive, via an uplink beam, the uplink signal 630 from the UE 104B. Alternatively or additionally, the repeater 186 may be configured to simultaneously amplify-and-forward the downlink signal and the uplink signal. As described above in further detail in reference to FIG. 5, the full-duplex communication operations may result in SI and/or large-delay SI being added to the uplink signal 630 received by the network device 102.

In some aspects, the full-duplex communication operations on the fronthaul side of the repeater 186 may cause large-delay CLI in a similar manner to the large-delay SI caused by the full-duplex communication operations on the service-side of the repeater 186. That is, a portion 620 of the uplink signal from the uplink beam on the fronthaul side of the repeater 186 may leak on to the downlink beam on the fronthaul side of the repeater 186 (e.g., local coupling). Alternatively or additionally, another portion 625 of the uplink signal may be reflected back by a random object 605 and received by the downlink beam on the fronthaul side of the repeater 186 (e.g., remote reflection or clutter echo). As such, the UE 104A may receive, via the downlink beam, the downlink signal 627 from network device 102 which may be combined with the large-delay CLI signals of the repeater 186 (e.g., a portion of the uplink signal from UE 104B).

Referring to FIGS. 5 and 6, the interference forwarded by the repeater 186 to the receiving device (e.g., base station 102, UE 104A) may have similar characteristics to remote reflections (e.g., clutter echo), such as a large-delay (e.g., latency) signal. In some aspects, the receiving device may be configured to perform one or more measurements to detect a presence of SI in the received signal caused by remote reflections. For example, the receiving device may determine based on the one or more measurements whether a level of the SI exceeds a particular threshold. That is, the receiving device may determine that the detected SI may reduce a likelihood that the received signal may be decoded and/or processed successfully. If or when the SI exceeds the particular threshold, the receiving device may be configured to perform one or more mitigation strategies to attempt to reduce the SI level. For example, the receiving device may perform cancellation procedures in the digital domain and/or analog domain to reduce and/or cancel out the effects of the SI. Alternatively or additionally, the receiving device may cause the transmitting device to adjust (e.g., increase or reduce) a transmit power level of the SI signal and/or the desired signal to reduce the effects of the SI. For example, the transmit power level may be adjusted to meet a desired performance level (e.g., signal-to-interference-plus-noise ratio (SINR)). In other aspects, the receiving device may adjust a shape of the downlink beam and/or the transmitting device may adjust a shape of the uplink beam to reduce the effects of the SI. For example, the receiving device and/or the transmitting device may perform receive and/or transmit beam reshaping (e.g., null-forming) to suppress side-lobes that may be contributing to the clutter echo. Alternatively or additionally, the receiving device may switch to a different beam for the received signal and/or the transmitting device may switch to a different beam for the transmitted signal. For example, a new direction of the adjusted transmit beam may result in the desired signal no longer being reflected by an object (e.g., 505A). In another example, a new direction of the adjusted receive beam may result in the remote reflection no longer being received by the receiving device.

However, while the interference forwarded by the repeater 186 to the receiving device (e.g., base station 102, UE 104A) may have similar characteristics to remote reflections, conventional mitigation strategies to attempt to reduce the SI level, as those described above, may not succeed in reducing the interference forwarded by the repeater 186. For example, a change of the transmit and/or receive beams at the transmitting and/or receiving devices, respectively, may not change the transmit and/or receive beams used by the repeater 186, and, thus, may not change the impact and/or strength of the interference forwarded by the repeater 186. Alternatively or additionally, a change to the transmit power level by the transmitting device may not change a power level of the interference forwarded by the repeater 186. For example, the repeater 186 may be configured to transmit at a constant transmit power, and, as such, may increase the amplification gain of the repeater 186 to compensate for a reduction in a power level of the transmitted signal.

Aspects presented herein provide for multiple manners for detecting a repeater 186 in the propagation path between a transmitting device (e.g., network device 102, UEs 104A-B) and a receiving device (e.g., UEs 104A-B, network device 102). For example, the transmitting device and the receiving device may be configured to measure a change in a performance level in response to applying one or more of the mitigation strategies described above. The transmitting device and the receiving device may be further configured to determine, according to the measured change, whether a repeater 186 is present in the propagation path between the transmitting device and the receiving device.

In some aspects, the transmitting device may be configured to send one or more signals (e.g., downlink signal, uplink signal) in one or more directions (e.g., via the downlink beam, via the uplink beam). Alternatively or additionally, the receiving device may be configured to receive and/or measure the one or more signals transmitted by the transmitting device using corresponding resources (e.g., one or more receive beamforming configurations). The transmitting device may include the TX repeater detection component 187. The receiving device may include the RX repeater detection component 188. Alternatively or additionally, the transmitting device or the receiving device may include the controlling repeater detection component 189.

In other optional or additional aspects, the transmitting device may be configured to send, for a given transmit/receive configuration, one or more additional signals using one or more different transmit power configurations. In such aspects, the receiving device may be configured to receive the one or more additional signals and to perform one or more measurements on the received signals to determine one or more measured metrics corresponding to each of the one more additional signals. The one or more measured metrics may comprise a reference signal received power (RSRP), a received signal strength indicator (RSSI), a signal-to-noise ratio (SNR), and/or a signal-to-interference-plus-noise ratio (SINR).

In other optional or additional aspects, the different transmit power configurations may comprise a periodic transmit configuration. For example, the periodic transmit configuration may indicate one or more periodically repeating sets of transmit power levels for transmitting the additional signals (e.g., sounding reference signals (SRS)). Alternatively or additionally, the different transmit power configurations may comprise a power ramping configuration indicating a descending or ascending set of transmit power levels for transmitting the additional signals. In some aspects, the transmit power levels may refer to total radiated power (TRP) and/or effective isotropic radiated power (EIRP). In other aspects, the different transmit power configurations may be configured dynamically (e.g., through downlink control information (DCI)), or semi-statically/statically (e.g., through radio resource control (RRC) signaling).

In other optional or additional aspects, the one or more measured metrics may be compared to determine a difference between the measured metrics corresponding to one additional signal (e.g., SRS) and the measured metrics corresponding to another additional signal (e.g., SRS). That is, the comparison may result in determining differences of the measured metrics across the different transmit power configurations used to transmit the one or more additional signals (e.g., SRS).

In other optional or additional aspects, the differences of the measured metrics may be used to detect the repeater 186 in the propagation path between the transmitting device and the receiving device. That is, the repeater 186 may be detected if or when the difference of the measured metrics satisfies a detection threshold. For example, if or when the difference in the measured metric does not exceed the detection threshold, the condition may indicate that the repeater 186 may have adjusted the amplification gain of the repeater 186 to compensate for the change in the transmit power of the transmitting device. Alternatively or additionally, the repeater 186 may not be present in the propagation path if or when the difference of the measured metrics does not satisfy the detection threshold. For example, if or when the difference in the measured metric exceeds the detection threshold, the condition may indicate that no repeater is present in the propagation path to compensate for the change in the transmit power of the transmitting device.

In some aspects, the detection threshold may be a predetermined value. In other aspects, the detection threshold may be determined by another device and/or entity (e.g., a controlling entity 550) and indicated to the transmitting device and/or the receiving device. In other aspects, the detection threshold may be beam-specific. That is, the repeater 186 may be detected according to a distinct detection threshold corresponding to a beamforming configuration of the propagation path.

In other optional or additional aspects, additional measurements may be performed by the transmitting device and/or the receiving device to obtain additional configuration information of the repeater 186. For example, the transmitting device and/or the receiving device may be configured to perform, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

In other optional or additional aspects, the transmitting device and/or receiving device may be configured to perform, according to the configuration information of the repeater 186 and in response to detecting the repeater 186, interference management, beam management, positioning, and/or mobility management. For example, the transmitting device and/or receiving device may be configured to report the detecting of the repeater 186 to one or more entities of the wireless communication system 100. In some aspects, the report may indicate a location of the repeater 186 and/or configuration corresponding to the repeater 186.

In some aspects, the wireless communication systems 500 and 600 depicted in FIGS. 5 and 6 may include a controlling entity 550. The controlling entity 550 (or control node) may be configured to provide the transmit power configurations and/or the detection threshold to the transmitting device and/or the receiving device. Alternatively or additionally, the controlling entity 550 may be configured to collect measurement reports comprising the measured metrics of the additional signals and/or indications indicating whether the repeater 186 has been detected. In some aspects, the transmitting device and the controlling entity 550 may be a same device. In other optional or additional aspects, the receiving device and the controlling entity 550 may be a same device.

Advantageously, the aspects presented herein may provide for a wireless communication device (e.g., base station, UE) to detect the presence of a repeater in the propagation path. In some aspects, in response to detecting the repeater, the wireless communication device may attempt to utilize the repeater to forward one or more communications of the wireless communication device, and, thus, enhance performance of the wireless communication device. In other aspects, the wireless communication device may adjust positioning (e.g., location) determination procedures to account for the presence of the repeater in the propagation path, and, as such, may improve the accuracy of the positioning determinations. Furthermore, the wireless communication device may also adjust interference management and/or beam management procedures to account for the presence of the repeater in the propagation path.

Figure 7:
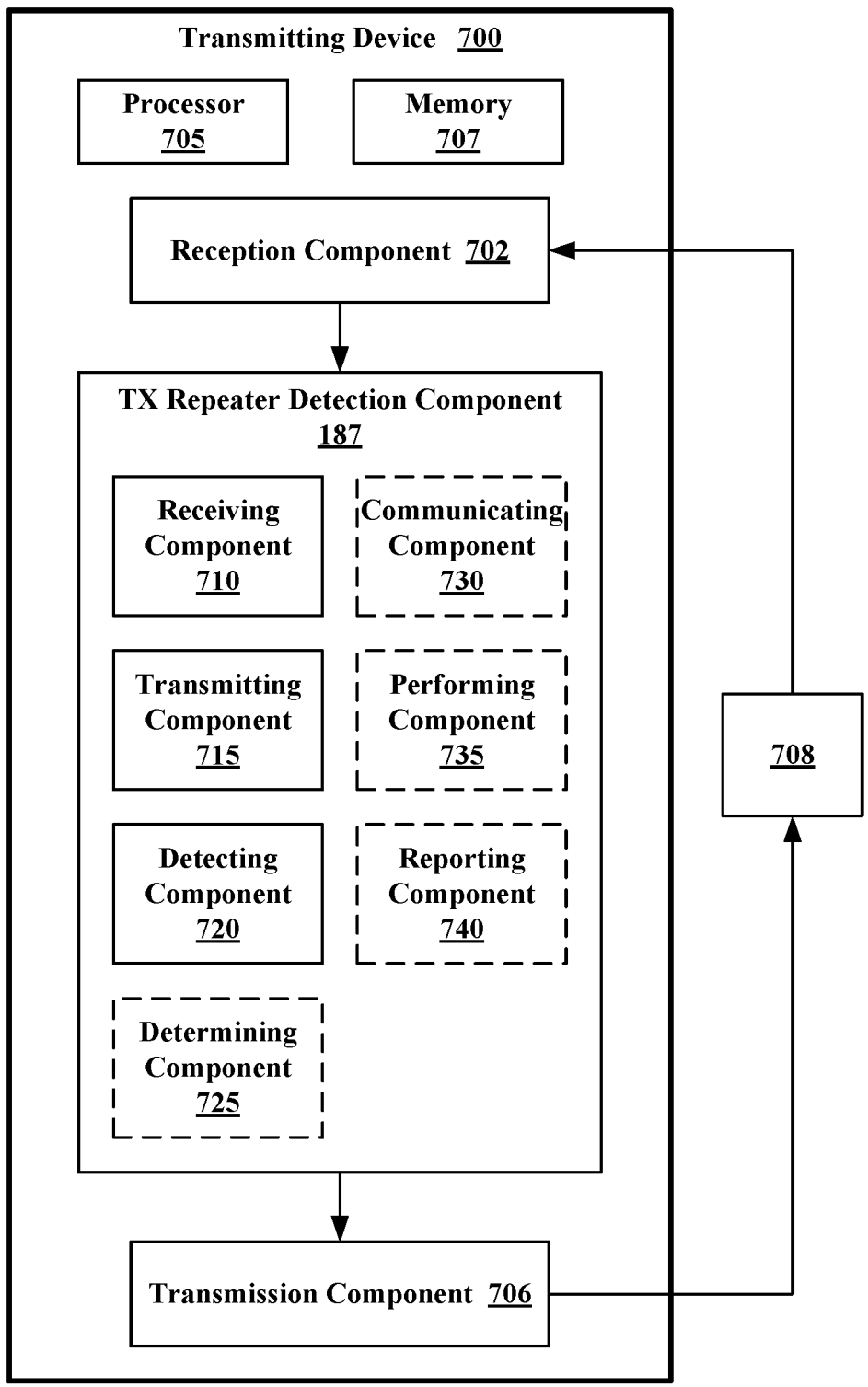
FIG. 7 is a diagram illustrating an example transmitting device for detecting a repeater on a propagation path of a wireless communication network, in accordance with various aspects of the present disclosure.
Figure 8:
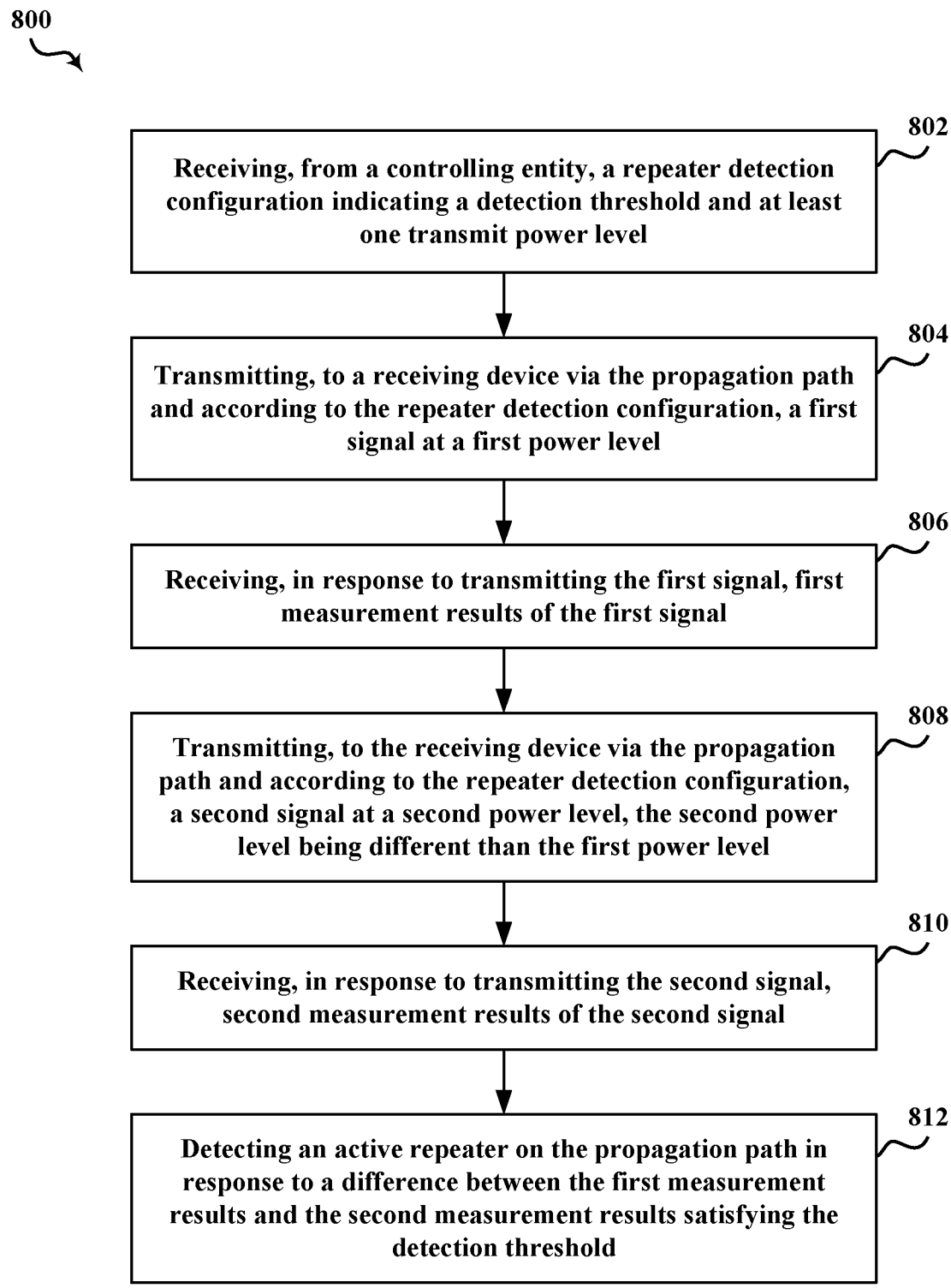
FIG. 8 is a flowchart of a method for detecting a repeater on a propagation path at a transmitting device of a wireless communication network, in accordance with various aspects of the present disclosure.

FIG. 7 is a diagram of an example transmitting device 700 for detecting a repeater on a propagation path of a wireless communication network. The transmitting device 700 may be a wireless communication device (e.g., base station 102 and/or UE 104 of FIGS. 1 and 3-6) or the wireless communication device may include the transmitting device 700. In some aspects, the transmitting device 700 may include a reception component 702 configured to receive wireless communications from another apparatus (e.g., apparatus 708), a TX repeater detection component 187 configured to detect a repeater on a propagation path at a transmitting device, a transmission component 706 configured to transmit wireless communications to another apparatus (e.g., apparatus 708), and which may be in communication with one another (e.g., via buses or electrical connections). As shown, the transmitting device 700 may be in communication with another apparatus 708 (such as a base station 102, UE 104, receiving device, controlling entity, or another wireless communication device) using the reception component 702 and the transmission component 706.

In some aspects, the transmitting device 700 may be configured to perform one or more operations described herein in connection with FIGS. 1 and 3-6. Alternatively or additionally, the transmitting device 700 may be configured to perform one or more processes described herein, such as method 800 of FIGS. 8-11, by such as via execution of TX repeater detection component 187 by processor 705 and/or memory 707. The processor 705 may include or may be similar in many respects to at least one of the RX processor 313, the controller/processor 315, the TX processor 316, the RX processor 353, the controller/processor 355, the TX processor 356 described above with reference to FIG. 3 and may include additional features not mentioned above. Furthermore, the memory 707 may include or may be similar in many respects to the memory 317 and/or the memory 357 described above with reference to FIG. 3 and may include additional features not mentioned above. In some aspects, the transmitting device 700 may include one or more components of a wireless communication device (e.g., base station 102, UE 104) described above in connection with FIGS. 1 and 3-6.

The reception component 702 may receive communications, such as reference signals, control information, data communications, or a combination thereof, from the apparatus 708. The reception component 702 may provide received communications to one or more other components of the transmitting device 700, such as the TX repeater detection component 187. In some aspects, the reception component 702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of a wireless communication device (e.g., base station 102, UE 104) described above in connection with FIGS. 1 and 3-6.

The transmission component 706 may transmit communications, such as reference signals, control information, data communications, or a combination thereof, to the apparatus 708. In some aspects, the TX repeater detection component 187 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In other aspects, the transmission component 706 may include one or more antennas, a modulator, a transmit MIMO processor, a transmit processor, a controller/processor, a memory, or a combination thereof, of a wireless communication device (e.g., base station 102, UE 104) described above in connection with FIGS. 1 and 3-6. In some aspects, the transmission component 706 may be co-located with the reception component 702 in a transceiver or transceiver component.

The TX repeater detection component 187 may be configured to detect a repeater on a propagation path at a transmitting device. In some aspects, the TX repeater detection component 187 may include a set of components, such as a receiving component 710 configured to receive a repeater detection configuration, a transmitting component 715 configured to transmit a first signal at a first power level and transmit a second signal at a second power level, and a detecting component 720 configured to detect an active repeater on the propagation path.

In other optional or additional aspects, the TX repeater detection component 187 may further include a determining component 725 configured to determine configuration information of the active repeater, a communicating component 730 configured to communicate at least one transmission, a performing component 735 configured to perform at least one of interference management, positioning, and mobility management, and a reporting component 740 configured to report the configuration information of the active repeater.

Alternatively or additionally, the set of components may be separate and distinct from the TX repeater detection component 187. In other aspects, one or more components of the set of components may include or may be implemented within a controller/processor (e.g., processor 705, RX processor 313, controller/processor 315, TX processor 316, RX processor 353, controller/processor 355, TX processor 356), a memory (e.g., memory 707, memory 317, memory 357), or a combination thereof, of the wireless communication devices (e.g., base station 102, UE 104) described in FIGS. 1 and 3-6. Alternatively or additionally, one or more components of the set of components may be implemented at least in part as software stored in a memory (e.g., memory 707, memory 317, memory 357). For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIGS. 1 and 3-6.

Referring to FIGS. 8-11, in operation, a transmitting device 700 may perform a method 800 of detecting a repeater on a propagation path. The method 800 may be performed by a wireless communication device (e.g., base station 102 and/or UE 104 of FIGS. 1 and 3-6). The method 800 may be performed by the TX repeater detection component 187 in communication with a receiving device and/or a controlling entity.

At block 802, the method 800 includes receiving, from a controlling entity, a repeater detection configuration indicating a detection threshold and at least one transmit power level. For example, in an aspect, the transmitting device 700, the processor 705, the memory 707, the TX repeater detection component 187, and/or the receiving component 710 may be configured to or may comprise means for receiving, from a controlling entity, a repeater detection configuration indicating a detection threshold and at least one transmit power level.

For example, the receiving at block 802 may include receiving one or more different transmit power configurations for a given transmit/receive configuration, as described above in reference to FIG. 6. The transmitting device 700 may use the one or more different transmit power configurations to configure transmission of one or more signals used to perform measurements on the propagation path. The one or more different transmit power configurations may comprise a periodic transmit configuration. Alternatively or additionally, the one or more different transmit power configurations may comprise a power ramping configuration. In other aspects, the one or more different transmit power configurations may be configured dynamically or semi-statically/statically.

In some aspects, the receiving at block 802 may include receiving a transmit power level configuration indicating a plurality of transmit power levels. The plurality of transmit power levels may comprise at least the first power level and the second power level. Alternatively or additionally, the transmit power level configuration may comprise a sounding reference signal (SRS) configuration. In other aspects, the plurality of transmit power levels may refer to total radiated power (TRP) and/or effective isotropic radiated power (EIRP).

In other optional or additional aspects, the receiving at block 802 may include receiving the detection threshold. In other aspects, the detection threshold may be beam-specific. That is, the repeater 186 may be detected according to a distinct detection threshold corresponding to a beamforming configuration of the propagation path. Alternatively or additionally, the detection threshold may be a predetermined value.

Further, for example, the receiving at block 802 may be performed to configure the transmitting device 700 to transmit one or more signals to perform measurements on the propagation path. The measured metrics resulting from the measurements may be compared according to the detection threshold to detect whether the repeater 186 is present in the propagation path.

At block 804, the method 800 includes transmitting, to a receiving device via the propagation path and according to the repeater detection configuration, a first signal at a first power level. For example, in an aspect, the transmitting device 700, the processor 705, the memory 707, the TX repeater detection component 187, and/or the transmitting component 715 may be configured to or may comprise means for transmitting, to a receiving device via the propagation path and according to the repeater detection configuration, a first signal at a first power level.

For example, the transmitting at block 804 may include transmitting the first signal at the first power level indicated by the one or more different transmit power configurations received at block 802. In some aspects, the first transmit power level may refer to TRP and/or EIRP).

In some aspects, the transmitting at block 804 may cause a receiving device to perform one or more measurements on the first signal to determine one or more measured metrics corresponding to the first signal.

In other optional or additional aspects, the transmitting device 700 and the receiving device may be a same device.

Further, for example, the transmitting at block 804 may be performed to provide a signal to the receiving device for performing one or more measurements to determine one or more measured metrics. The one or more measured metrics resulting from the one or more measurements may be compared according to the detection threshold to detect whether the repeater 186 is present in the propagation path.

At block 806, the method 800 includes receiving, in response to transmitting the first signal, first measurement results of the first signal. For example, in an aspect, the transmitting device 700, the processor 705, the memory 707, the TX repeater detection component 187, and/or the receiving component 710 may be configured to or may comprise means for receiving, in response to transmitting the first signal, first measurement results of the first signal.

For example, the receiving at block 806 may include receiving, from the receiving device, the one or more measured metrics determined by the receiving device by performing the one or more measurements on the first signal. The one or more measured metrics may comprise a RSRP, a RSSI, an SNR, and/or a SINR.

Alternatively or additionally, the receiving at block 806 may include receiving, from the controlling entity, the one or more measured metrics determined by the receiving device.

Further, for example, the receiving at block 806 may be performed to collect first measurement results corresponding to the first signal. The first measurement results may be compared, according to the detection threshold, with second measurement results corresponding to a second signal. The transmitting device 700 may detect whether the repeater 186 is present on the propagation path according to the comparison of the first measurement results and the second measurement results.

At block 808, the method 800 includes transmitting, to the receiving device via the propagation path and according to the repeater detection configuration, a second signal at a second power level, the second power level being different than the first power level. For example, in an aspect, the transmitting device 700, the processor 705, the memory 707, the TX repeater detection component 187, and/or the transmitting component 715 may be configured to or may comprise means for transmitting, to the receiving device via the propagation path and according to the repeater detection configuration, a second signal at a second power level, the second power level being different than the first power level.

For example, the transmitting at block 808 may include transmitting the second signal at the second power level indicated by the one or more different transmit power configurations received at block 802. In some aspects, the second transmit power level may refer to TRP and/or EIRP.

In some aspects, the transmitting at block 808 may cause the receiving device to perform one or more measurements on the second signal to determine one or more measured metrics corresponding to the second signal.

Further, for example, the transmitting at block 808 may be performed to provide a second signal to the receiving device for performing one or more measurements to determine one or more measured metrics. The one or more measured metrics resulting from the one or more measurements may be compared according to the detection threshold to detect whether the repeater 186 is present in the propagation path.

At block 810, the method 800 includes receiving, in response to transmitting the second signal, second measurement results of the second signal. For example, in an aspect, the transmitting device 700, the processor 705, the memory 707, the TX repeater detection component 187, and/or the receiving component 710 may be configured to or may comprise means for receiving, in response to transmitting the second signal, second measurement results of the second signal.

For example, the receiving at block 810 may include receiving, from the receiving device, the one or more measured metrics determined by the receiving device by performing the one or more measurements on the second signal. The one or more measured metrics may comprise a RSRP, a RSSI, an SNR, and/or a SINR.

Alternatively or additionally, the receiving at block 810 may include receiving, from the controlling entity, the one or more measured metrics determined by the receiving device.

Further, for example, the receiving at block 810 may be performed to collect second measurement results corresponding to the second signal. The second measurement results may be compared, according to the detection threshold, with first measurement results corresponding to the first signal. The transmitting device 700 may detect whether the repeater 186 is present on the propagation path according to the comparison of the first measurement results and the second measurement results.

At block 812, the method 800 includes detecting an active repeater on the propagation path in response to a difference between the first measurement results and the second measurement results satisfying the detection threshold. For example, in an aspect, the transmitting device 700, the processor 705, the memory 707, the TX repeater detection component 187, and/or the detecting component 720 may be configured to or may comprise means for detecting an active repeater on the propagation path in response to a difference between the first measurement results and the second measurement results satisfying the detection threshold.

For example, the detecting at block 812 may include comparing the first measurement results with the second measurement results to determine a difference between the first measurement results with the second measurement results. For example, the detecting at block 812 may include comparing a first SNR of the first measurement results with a second SNR of the second measurement results to determine a difference between the first SNR and the second SNR.

In some aspects, the detecting at block 812 may include detecting the repeater 186 according to the difference between the first measurement results with the second measurement results. For example, the detecting at block 812 may include detecting the presence of the repeater 186 if or when the difference of the measured metrics satisfies the detection threshold. That is, if or when the difference between the first measurement results with the second measurement results does not exceed the detection threshold, the detecting at block 812 may include determining that the repeater 186 is present on the propagation path. Alternatively or additionally, the detecting at block 812 may include not detecting the presence of the repeater 186 if or when the difference of the measured metrics does not satisfy the detection threshold. That is, if or when the difference between the first measurement results with the second measurement results exceeds the detection threshold, the detecting at block 812 may include determining that the repeater 186 is not present on the propagation path.

Further, for example, the detecting at block 812 may be performed to detect whether a repeater 186 is present on the propagation path. If or when the presence of the repeater 186 is detected by the transmitting device, the transmitting device 700 may, in response, adjust at least one of interference management, beam management, positioning, and mobility management, and, as such improve positioning accuracy and performance of the transmitting device 700.

Figure 9:
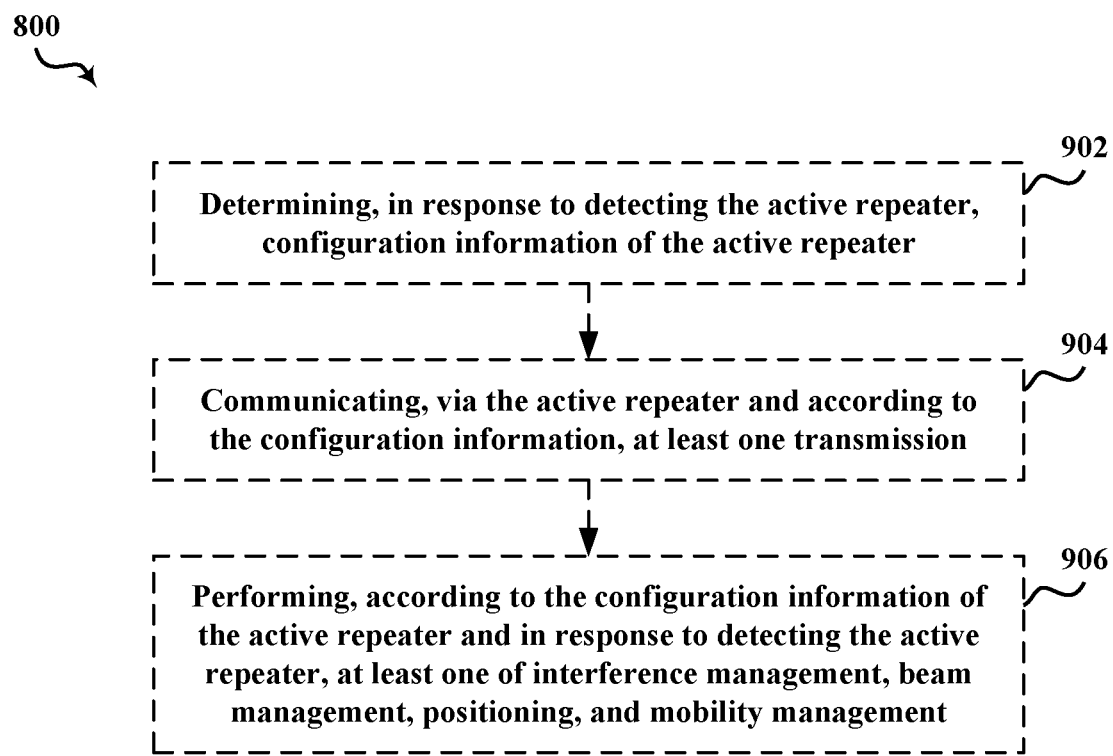
FIG. 9 is a flowchart of first additional or optional steps for the method for detecting a repeater on a propagation path at a transmitting device of a wireless communication network in accordance with various aspects of the present disclosure.

Referring to FIG. 9, in an optional or additional aspect that may be combined with any other aspect, at block 902, the method 800 may further include determining, in response to detecting the active repeater, configuration information of the active repeater. For example, in an aspect, the transmitting device 700, the processor 705, the memory 707, the TX repeater detection component 187, and/or the determining component 725 may be configured to or may comprise means for determining, in response to detecting the active repeater, configuration information of the active repeater.

For example, the determining at block 902 may include performing additional measurements to obtain the additional configuration information of the repeater 186. For example, the transmitting device 700 may perform, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

Further, for example, the determining at block 902 may be performed to obtain additional configuration information of the repeater 186. As such, the transmitting device 700 may configure communications to use the repeater 186 in the propagation path and potentially enhance performance of the transmitting device 700.

In this optional or additional aspect, at block 904, the method 800 may further include communicating, via the active repeater and according to the configuration information, at least one transmission. For example, in an aspect, the transmitting device 700, the processor 705, the memory 707, the TX repeater detection component 187, and/or the communicating component 730 may be configured to or may comprise means for communicating, via the active repeater and according to the configuration information, at least one transmission.

For example, the communicating at block 904 may include transmitting, according to the configuration information, at least one transmission via the repeater 186. Alternatively or additionally, the communicating at block 904 may include receiving, according to the configuration information, at least one transmission via the repeater 186.

Further, for example, the communicating at block 904 may be performed to improve performance of communications performed by the transmitting device 700 by incorporating the repeater 186 into the propagation path.

In this optional or additional aspect, at block 904, the method 800 may further include performing, according to the configuration information of the active repeater and in response to detecting the active repeater, at least one of interference management, beam management, positioning, and mobility management. For example, in an aspect, the transmitting device 700, the processor 705, the memory 707, the TX repeater detection component 187, and/or the performing component 735 may be configured to or may comprise means for performing, according to the configuration information of the active repeater and in response to detecting the active repeater, at least one of interference management, beam management, positioning, and mobility management.

For example, the performing at block 906 may include reporting the detecting of the repeater 186 to one or more entities of the wireless communication system 100. In some aspects, the report may indicate a location of the repeater 186 and/or configuration corresponding to the repeater 186.

In some aspects, the performing at block 906 may include adjusting positioning (e.g., location) determination procedures to account for the presence of the repeater in the propagation path. In other optional or additional aspects, the performing at block 906 may include adjusting interference management and/or beam management procedures to account for the presence of the repeater in the propagation path.

Further, for example, the performing at block 906 may be performed to improve performance and/or accuracy of positioning determination procedures, interference management and/or beam management procedures performed by the wireless communication system 100.

Figure 10:
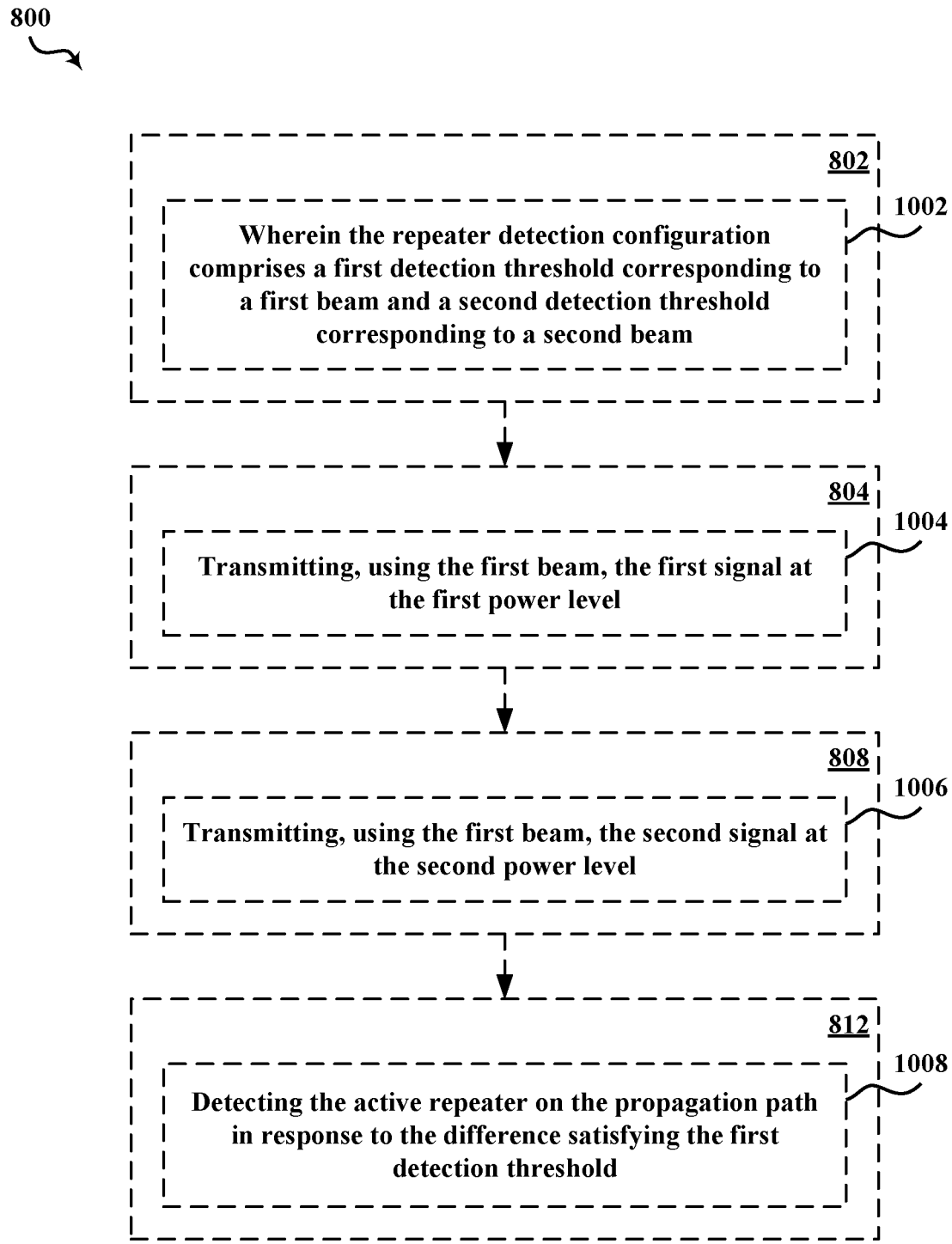
FIG. 10 is a flowchart of second additional or optional steps for the method for detecting a repeater on a propagation path at a transmitting device of a wireless communication network in accordance with various aspects of the present disclosure.

Referring to FIG. 10, in an optional or additional aspect that may be combined with any other aspect, at block 1002, the receiving, at block 802, from the controlling entity, of the repeater detection configuration indicating the detection threshold and the at least one transmit power level may further include wherein the repeater detection configuration comprises a first detection threshold corresponding to a first beam and a second detection threshold corresponding to a second beam. For example, in an aspect, the transmitting device 700, the processor 705, the memory 707, the TX repeater detection component 187, and/or the receiving component 710 may be configured to or may comprise means for wherein the repeater detection configuration comprises a first detection threshold corresponding to a first beam and a second detection threshold corresponding to a second beam.

For example, the receiving at block 1002 may include receiving, from the controlling entity, the repeater detection configuration comprising the first detection threshold corresponding to the first beam and the second detection threshold corresponding to the second beam. That is, the detection threshold may be beam-specific as described above in reference to FIG. 6.

Further, for example, the receiving at block 1002 may be performed to associate distinct detection thresholds according to the beamforming configuration of the transmitting device.

In this optional or additional aspect, at block 1004, the transmitting, at block 804, to a receiving device via the propagation path and according to the repeater detection configuration, of the first signal at the first power level may further include transmitting, using the first beam, the first signal at the first power level. For example, in an aspect, the transmitting device 700, the processor 705, the memory 707, the TX repeater detection component 187, and/or the transmitting component 715 may be configured to or may comprise means for transmitting, using the first beam, the first signal at the first power level.

For example, the transmitting at block 1004 may include transmitting, using the first beam, the first signal at the first power level indicated by the one or more different transmit power configurations received at block 802. In some aspects, the first power level may refer to TRP and/or EIRP.

Further, for example, the transmitting at block 1004 may be performed to provide a signal to the receiving device for performing one or more measurements to determine one or more measured metrics. The one or more measured metrics resulting from the one or more measurements may be compared according to the detection threshold to detect whether the repeater 186 is present in the propagation path.

In this optional or additional aspect, at block 1004, the transmitting, at block 808, to the receiving device via the propagation path and according to the repeater detection configuration, of the second signal at the second power level may further comprise transmitting, using the first beam, the second signal at the second power level. For example, in an aspect, the transmitting device 700, the processor 705, the memory 707, the TX repeater detection component 187, and/or the transmitting component 715 may be configured to or may comprise means for transmitting, using the first beam, the second signal at the second power level.

For example, the transmitting at block 1006 may include transmitting, using the first beam, the second signal at the second power level indicated by the one or more different transmit power configurations received at block 802. In some aspects, the second power level may refer to TRP and/or EIRP.

Further, for example, the transmitting at block 1006 may be performed to provide a second signal to the receiving device for performing one or more measurements to determine one or more measured metrics. The one or more measured metrics resulting from the one or more measurements may be compared according to the detection threshold to detect whether the repeater 186 is present in the propagation path.

In this optional or additional aspect, at block 1008, the detecting, at block 812, of the active repeater on the propagation path in response to a difference between the first measurement results and the second measurement results satisfying the detection threshold may further include detecting the active repeater on the propagation path in response to the difference satisfying the first detection threshold. For example, in an aspect, the transmitting device 700, the processor 705, the memory 707, the TX repeater detection component 187, and/or the detecting component 720 may be configured to or may comprise means for detecting the active repeater on the propagation path in response to the difference satisfying the first detection threshold.

For example, the detecting at block 1008 may include comparing the first measurement results corresponding to the first beam with the second measurement results corresponding to the first beam to determine a difference between the first measurement results with the second measurement results.

Further, for example, the detecting at block 1008 may be performed to detect whether a repeater 186 is present on the propagation path according to the beamforming configuration.

Figure 11:
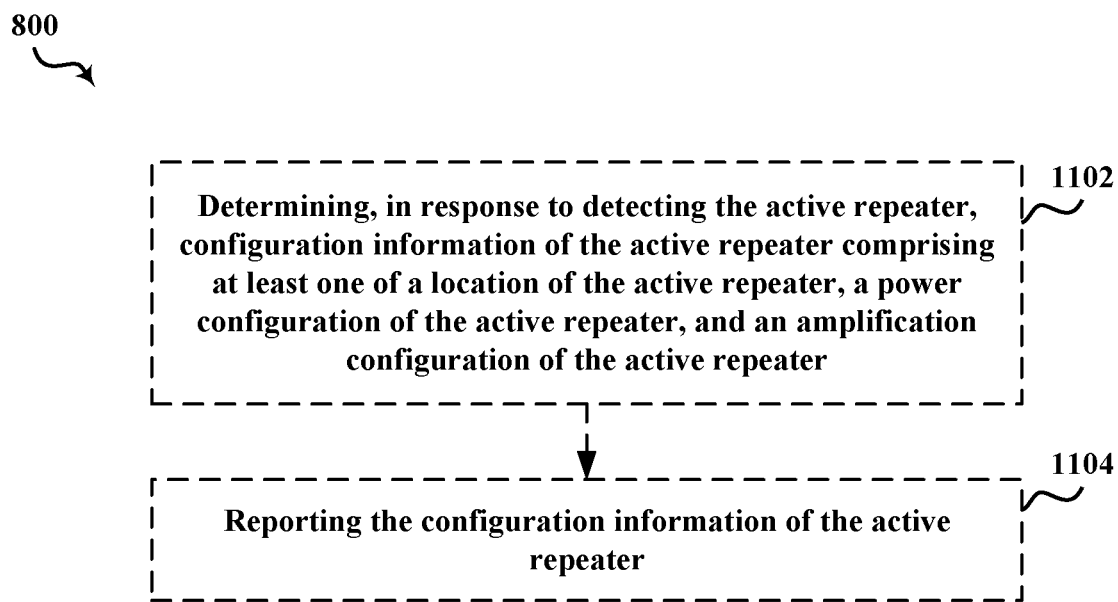
FIG. 11 is a flowchart of third additional or optional steps for the method for detecting a repeater on a propagation path at a transmitting device of a wireless communication network in accordance with various aspects of the present disclosure.

Referring to FIG. 11, in an optional or additional aspect that may be combined with any other aspect, at block 1102, the method 800 may further include determining, in response to detecting the active repeater, configuration information of the active repeater comprising at least one of a location of the active repeater, a power configuration of the active repeater, and an amplification configuration of the active repeater. For example, in an aspect, the transmitting device 700, the processor 705, the memory 707, the TX repeater detection component 187, and/or the determining component 725 may be configured to or may comprise means for determining, in response to detecting the active repeater, configuration information of the active repeater comprising at least one of a location of the active repeater, a power configuration of the active repeater, and an amplification configuration of the active repeater.

For example, the determining at block 1102 may include performing additional measurements to obtain the additional configuration information of the repeater 186. For example, the transmitting device 700 may perform, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

Further, for example, the determining at block 1102 may be performed to obtain additional configuration information of the repeater 186. As such, the transmitting device 700 may configure communications to use the repeater 186 in the propagation path and potentially enhance performance of the transmitting device 700.

In this optional or additional aspect, at block 1104, the method 800 may further include reporting the configuration information of the active repeater. For example, in an aspect, the transmitting device 700, the processor 705, the memory 707, the TX repeater detection component 187, and/or the reporting component 740 may be configured to or may comprise means for reporting the configuration information of the active repeater.

For example, the reporting at block 1104 may include sending the configuration information to the receiving device. Alternatively or additionally, the reporting at block 1104 may include sending the configuration information to the controlling entity.

Further, for example, the reporting at block 1104 may be performed to indicate the presence and/or configuration of the repeater 186 to the wireless communication system 100.

Figure 12:
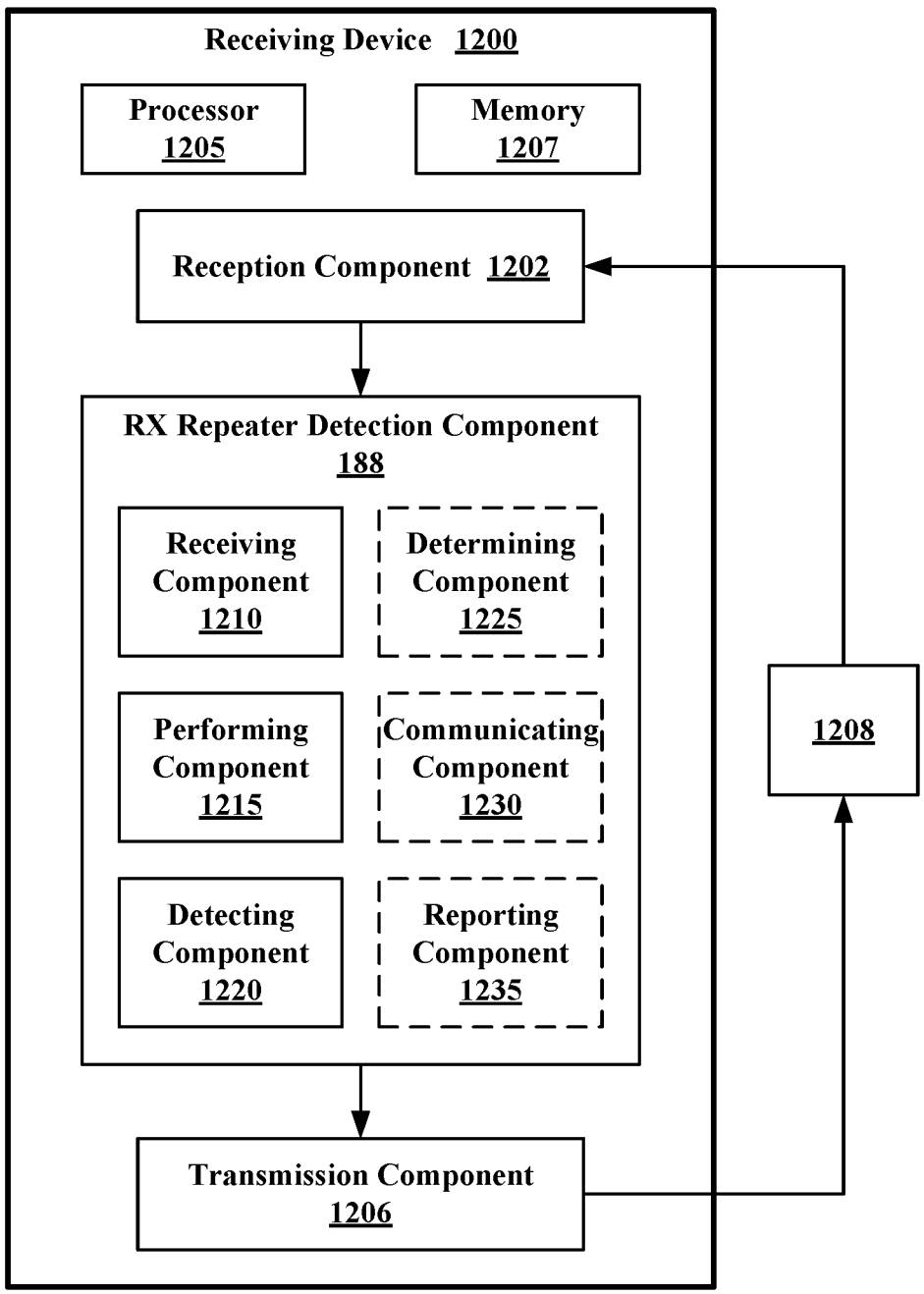
FIG. 12 is a diagram illustrating an example receiving device for detecting a repeater on a propagation path of a wireless communication network, in accordance with various aspects of the present disclosure.
Figure 13:
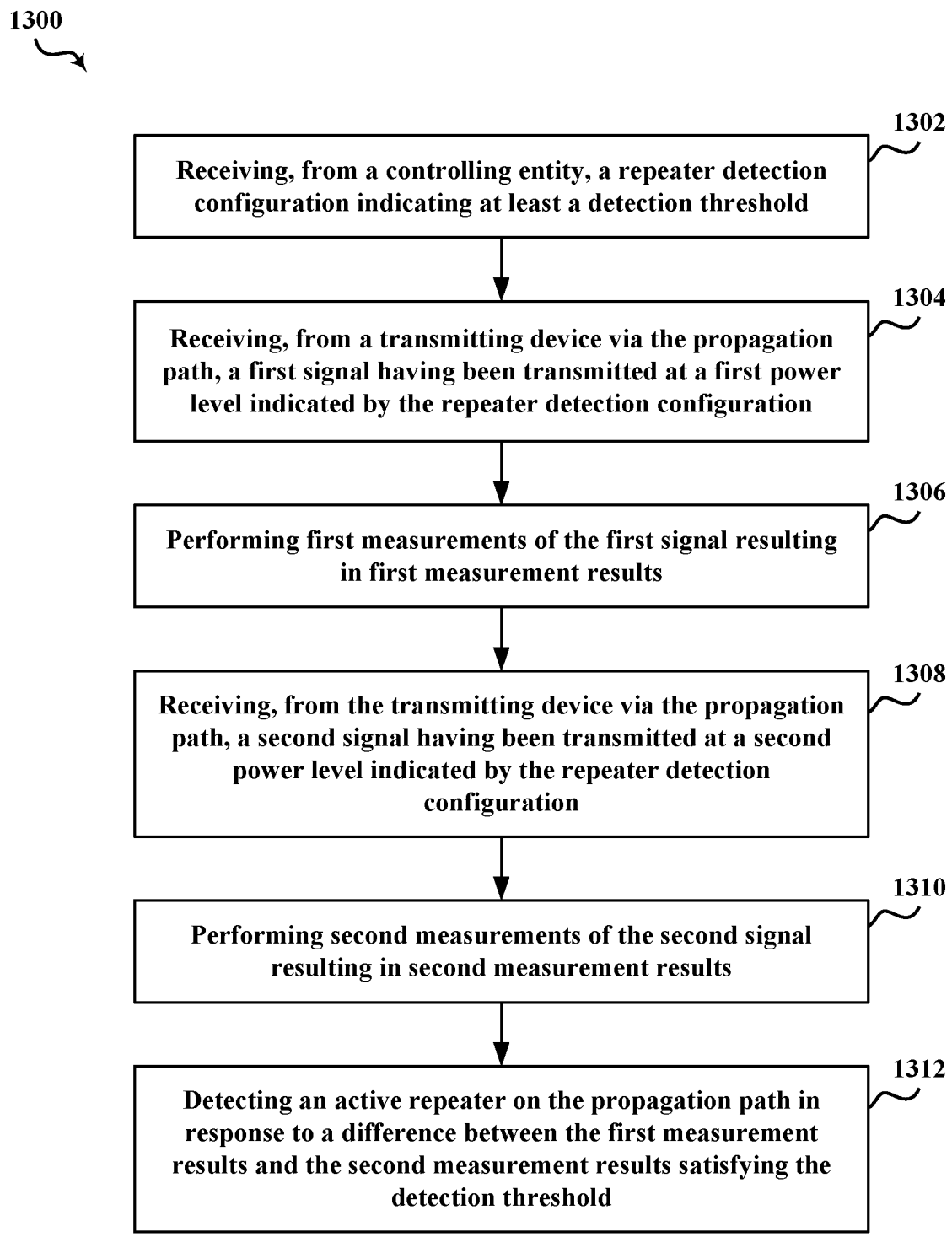
FIG. 13 is a flowchart of a method for detecting a repeater on a propagation path at a receiving device of a wireless communication network, in accordance with various aspects of the present disclosure.

FIG. 12 is a diagram of an example receiving device 1200 for detecting a repeater on a propagation path of a wireless communication network. The receiving device 1200 may be a wireless communication device (e.g., base station 102 and/or UE 104 of FIGS. 1 and 3-6) or the wireless communication device may include the receiving device 1200. In some aspects, the receiving device 1200 may include a reception component 1202 configured to receive wireless communications from another apparatus (e.g., apparatus 1208), a RX repeater detection component 188 configured to detect a repeater on a propagation path at a receiving device, a transmission component 1206 configured to transmit wireless communications to another apparatus (e.g., apparatus 1208), and which may be in communication with one another (e.g., via buses or electrical connections). As shown, the receiving device 1200 may be in communication with another apparatus 1208 (such as a base station 102, UE 104, receiving device, controlling entity, or another wireless communication device) using the reception component 1202 and the transmission component 1206.

In some aspects, the receiving device 1200 may be configured to perform one or more operations described herein in connection with FIGS. 1 and 3-6. Alternatively or additionally, the receiving device 1200 may be configured to perform one or more processes described herein, such as method 1300 of FIGS. 13-16, by such as via execution of RX repeater detection component 188 by processor 1205 and/or memory 1207. The processor 1205 may include or may be similar in many respects to at least one of the RX processor 313, the controller/processor 315, the TX processor 316, the RX processor 353, the controller/processor 355, the TX processor 356 described above with reference to FIG. 3 and may include additional features not mentioned above. Furthermore, the memory 1207 may include or may be similar in many respects to the memory 317 and/or the memory 357 described above with reference to FIG. 3 and may include additional features not mentioned above. In some aspects, the receiving device 1200 may include one or more components of a wireless communication device (e.g., base station 102, UE 104) described above in connection with FIGS. 1 and 3-6.

The reception component 1202 may receive communications, such as reference signals, control information, data communications, or a combination thereof, from the apparatus 1208. The reception component 1202 may provide received communications to one or more other components of the receiving device 1200, such as the RX repeater detection component 188. In some aspects, the reception component 1202 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of a wireless communication device (e.g., base station 102, UE 104) described above in connection with FIGS. 1 and 3-6.

The transmission component 1206 may transmit communications, such as reference signals, control information, data communications, or a combination thereof, to the apparatus 1208. In some aspects, the RX repeater detection component 188 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In other aspects, the transmission component 1206 may include one or more antennas, a modulator, a transmit MIMO processor, a transmit processor, a controller/processor, a memory, or a combination thereof, of a wireless communication device (e.g., base station 102, UE 104) described above in connection with FIGS. 1 and 3-6. In some aspects, the transmission component 1206 may be co-located with the reception component 1202 in a transceiver or transceiver component.

The RX repeater detection component 188 may be configured to detect a repeater on a propagation path at a receiving device. In some aspects, the RX repeater detection component 188 may include a set of components, such as a receiving component 1210 configured to receive a first signal having been transmitted at a first power level and to receive a second signal having been transmitted at a second power level, a performing component 1215 configured to perform first measurements of the first signal resulting in first measurement results and to perform second measurements of the second signal resulting in second measurement results, and a detecting component 1220 configured to detect an active repeater on the propagation path.

In other optional or additional aspects, the RX repeater detection component 188 may further include a determining component 1225 configured to determine configuration information of the active repeater, a communicating component 1230 configured to communicate at least one transmission, a reporting component 1235 configured to report the configuration information of the active repeater.

Alternatively or additionally, the set of components may be separate and distinct from the RX repeater detection component 188. In other aspects, one or more components of the set of components may include or may be implemented within a controller/processor (e.g., processor 1205, RX processor 313, controller/processor 315, TX processor 316, RX processor 353, controller/processor 355, TX processor 356), a memory (e.g., memory 1207, memory 317, memory 357), or a combination thereof, of the wireless communication devices (e.g., base station 102, UE 104) described in FIGS. 1 and 3-6. Alternatively or additionally, one or more components of the set of components may be implemented at least in part as software stored in a memory (e.g., memory 1207, memory 317, memory 357). For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 and 3-6.

Referring to FIGS. 13-16, in operation, a receiving device 1200 may perform a method 1300 of detecting a repeater on a propagation path. The method 1300 may be performed by a wireless communication device (e.g., base station 102 and/or UE 104 of FIGS. 1 and 3-6). The method 1300 may be performed by the RX repeater detection component 188 in communication with a transmitting device and/or a controlling entity.

At block 1302, the method 1300 includes receiving, from a controlling entity, a repeater detection configuration indicating at least a detection threshold. For example, in an aspect, the receiving device 1200, the processor 1205, the memory 1207, the RX repeater detection component 188, and/or the receiving component 1210 may be configured to or may comprise means for receiving, from a controlling entity, a repeater detection configuration indicating at least a detection threshold.

For example, the receiving at block 1302 may include receiving the detection threshold. In other aspects, the detection threshold may be beam-specific. That is, the repeater 186 may be detected according to a distinct detection threshold corresponding to a beamforming configuration of the propagation path. Alternatively or additionally, the detection threshold may be a predetermined value.

Further, for example, the receiving at block 1302 may be performed to configure the receiving device 1200 to detect whether the repeater 186 is present in the propagation path according to the detection threshold.

At block 1304, the method 1300 includes receiving, from a transmitting device via the propagation path, a first signal having been transmitted at a first power level indicated by the repeater detection configuration. For example, in an aspect, the receiving device 1200, the processor 1205, the memory 1207, the RX repeater detection component 188, and/or the receiving component 1210 may be configured to or may comprise means for receiving, from a transmitting device via the propagation path, a first signal having been transmitted at a first power level indicated by the repeater detection configuration.

For example, the receiving at block 1304 may include receiving the first signal having been transmitted at the first power level indicated by one or more different transmit power configurations comprised by the repeater detection configuration. In some aspects, the first power level may refer to TRP and/or EIRP.

In some aspects, the receiving device 1200 and the transmitting device 700 may be a same device.

Further, for example, the receiving at block 1304 may be performed to obtain a signal by the receiving device 1200 for performing one or more measurements to determine one or more measured metrics. The one or more measured metrics resulting from the one or more measurements may be compared according to the detection threshold to detect whether the repeater 186 is present in the propagation path.

At block 1306, the method 1300 includes performing first measurements of the first signal resulting in first measurement results. For example, in an aspect, the receiving device

1200, the processor 1205, the memory 1207, the RX repeater detection component 188, and/or the performing component 1215 may be configured to or may comprise means for performing first measurements of the first signal resulting in first measurement results.

For example, the performing at block 1306 may include performing one or more measurements on the first signal and determining one or more measured metrics corresponding to the first signal. The one or more measured metrics may comprise a RSRP, a RSSI, an SNR, and/or a SINR.

In some aspects, the performing at block 1306 may include sending, to the transmitting device 700, the one or more measured metrics corresponding to the first signal. Alternatively or additionally, the performing at block 1306 may include sending, to the controlling entity, the one or more measured metrics corresponding to the first signal.

Further, for example, the performing at block 1306 may be performed to obtain and collect first measurement results corresponding to the first signal. The first measurement results may be compared, according to the detection threshold, with second measurement results corresponding to a second signal. The receiving device 1200 may detect whether the repeater 186 is present on the propagation path according to the comparison of the first measurement results and the second measurement results.

At block 1308, the method 1300 includes receiving, from the transmitting device via the propagation path, a second signal having been transmitted at a second power level indicated by the repeater detection configuration. For example, in an aspect, the receiving device 1200, the processor 1205, the memory 1207, the RX repeater detection component 188, and/or the receiving component 1210 may be configured to or may comprise means for receiving, from the transmitting device via the propagation path, a second signal having been transmitted at a second power level indicated by the repeater detection configuration.

For example, the receiving at block 1308 may include receiving the second signal having been transmitted at the second power level indicated by one or more different transmit power configurations comprised by the repeater detection configuration. In some aspects, the second power level may refer to TRP and/or EIRP.

Further, for example, the receiving at block 1308 may be performed to obtain a second signal by the receiving device 1200 for performing one or more measurements to determine one or more measured metrics. The one or more measured metrics may comprise a RSRP, a RSSI, an SNR, and/or a SINR. The one or more measured metrics resulting from the one or more measurements may be compared according to the detection threshold to detect whether the repeater 186 is present in the propagation path.

At block 1310, the method 1300 includes performing second measurements of the second signal resulting in second measurement results. For example, in an aspect, the receiving device 1200, the processor 1205, the memory 1207, the RX repeater detection component 188, and/or the performing component 1215 may be configured to or may comprise means for performing second measurements of the second signal resulting in second measurement results.

For example, the performing at block 1310 may include performing one or more measurements on the second signal and determining one or more measured metrics corresponding to the second signal.

In some aspects, the performing at block 1310 may include sending, to the transmitting device 700, the one or more measured metrics corresponding to the second signal. Alternatively or additionally, the performing at block 1310 may include sending, to the controlling entity, the one or more measured metrics corresponding to the second signal.

Further, for example, the performing at block 1310 may be performed to obtain and collect second measurement results corresponding to the second signal. The second measurement results may be compared, according to the detection threshold, with first measurement results corresponding to the first signal. The receiving device 1200 may detect whether the repeater 186 is present on the propagation path according to the comparison of the first measurement results and the second measurement results.

At block 1312, the method 1300 includes detecting an active repeater on the propagation path in response to a difference between the first measurement results and the second measurement results satisfying the detection threshold. For example, in an aspect, the receiving device 1200, the processor 1205, the memory 1207, the RX repeater detection component 188, and/or the detecting component 1220 may be configured to or may comprise means for detecting an active repeater on the propagation path in response to a difference between the first measurement results and the second measurement results satisfying the detection threshold.

For example, the detecting at block 1312 may include comparing the first measurement results with the second measurement results to determine a difference between the first measurement results with the second measurement results. For example, the detecting at block 1312 may include comparing a first SNR of the first measurement results with a second SNR of the second measurement results to determine a difference between the first SNR and the second SNR.

In some aspects, the detecting at block 1312 may include detecting the repeater 186 according to the difference between the first measurement results with the second measurement results. For example, the detecting at block 1312 may include detecting the presence of the repeater 186 if or when the difference of the measured metrics satisfies the detection threshold. That is, if or when the difference between the first measurement results with the second measurement results does not exceed the detection threshold, the detecting at block 1312 may include determining that the repeater 186 is present on the propagation path. Alternatively or additionally, the detecting at block 1312 may include not detecting the presence of the repeater 186 if or when the difference of the measured metrics does not satisfy the detection threshold. That is, if or when the difference between the first measurement results with the second measurement results exceeds the detection threshold, the detecting at block 1312 may include determining that the repeater 186 is not present on the propagation path.

Further, for example, the detecting at block 1312 may be performed to detect whether a repeater 186 is present on the propagation path. If or when the presence of the repeater 186 is detected by the receiving device 1200, the receiving device 1200 may, in response, adjust at least one of interference management, beam management, positioning, and mobility management, and, as such improve positioning accuracy and performance of the receiving device 1200.

Figure 14:
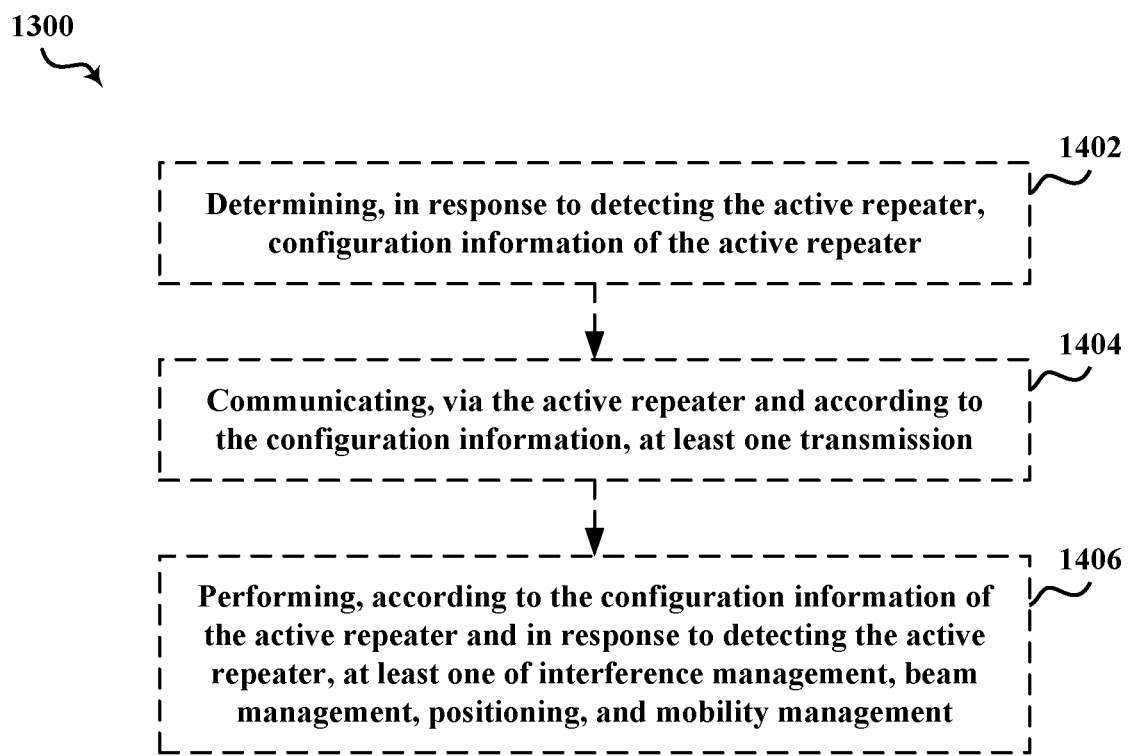
FIG. 14 is a flowchart of first additional or optional steps for the method for detecting a repeater on a propagation path at a receiving device of a wireless communication network in accordance with various aspects of the present disclosure.

Referring to FIG. 14, in an optional or additional aspect that may be combined with any other aspect, at block 1402, the method 1300 may further include determining, in response to detecting the active repeater, configuration information of the active repeater. For example, in an aspect, the receiving device 1200, the processor 1205, the memory 1207, the RX repeater detection component 188, and/or the determining component 1225 may be configured to or may comprise means for determining, in response to detecting the active repeater, configuration information of the active repeater.

For example, the determining at block 1402 may include performing additional measurements to obtain the additional configuration information of the repeater 186. For example, the receiving device 1200 may perform, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

Further, for example, the determining at block 1402 may be performed to obtain additional configuration information of the repeater 186. As such, the receiving device 1200 may configure communications to use the repeater 186 in the propagation path and potentially enhance performance of the receiving device 1200.

In this optional or additional aspect, at block 1404, the method 1300 may further include communicating, via the active repeater and according to the configuration information, at least one transmission. For example, in an aspect, the receiving device 1200, the processor 1205, the memory 1207, the RX repeater detection component 188, and/or the communicating component 1230 may be configured to or may comprise means for communicating, via the active repeater and according to the configuration information, at least one transmission.

For example, the communicating at block 1404 may include transmitting, according to the configuration information, at least one transmission via the repeater 186. Alternatively or additionally, the communicating at block 1404 may include receiving, according to the configuration information, at least one transmission via the repeater 186.

Further, for example, the communicating at block 1404 may be performed to improve performance of communications performed by the receiving device 1200 by incorporating the repeater 186 into the propagation path.

In this optional or additional aspect, at block 1404, the method 1300 may further include performing, according to the configuration information of the active repeater and in response to detecting the active repeater, at least one of interference management, beam management, positioning, and mobility management. For example, in an aspect, the receiving device 1200, the processor 1205, the memory 1207, the RX repeater detection component 188, and/or the performing component 1215 may be configured to or may comprise means for performing, according to the configuration information of the active repeater and in response to detecting the active repeater, at least one of interference management, beam management, positioning, and mobility management.

For example, the performing at block 1406 may include reporting the detecting of the repeater 186 to one or more entities of the wireless communication system 100. In some aspects, the report may indicate a location of the repeater 186 and/or configuration corresponding to the repeater 186.

In some aspects, the performing at block 1406 may include adjusting positioning (e.g., location) determination procedures to account for the presence of the repeater in the propagation path. In other optional or additional aspects, the performing at block 1406 may include adjusting interference management and/or beam management procedures to account for the presence of the repeater in the propagation path.

Further, for example, the performing at block 1406 may be performed to improve performance and/or accuracy of positioning determination procedures, interference management and/or beam management procedures performed by the wireless communication system 100.

Figure 15:
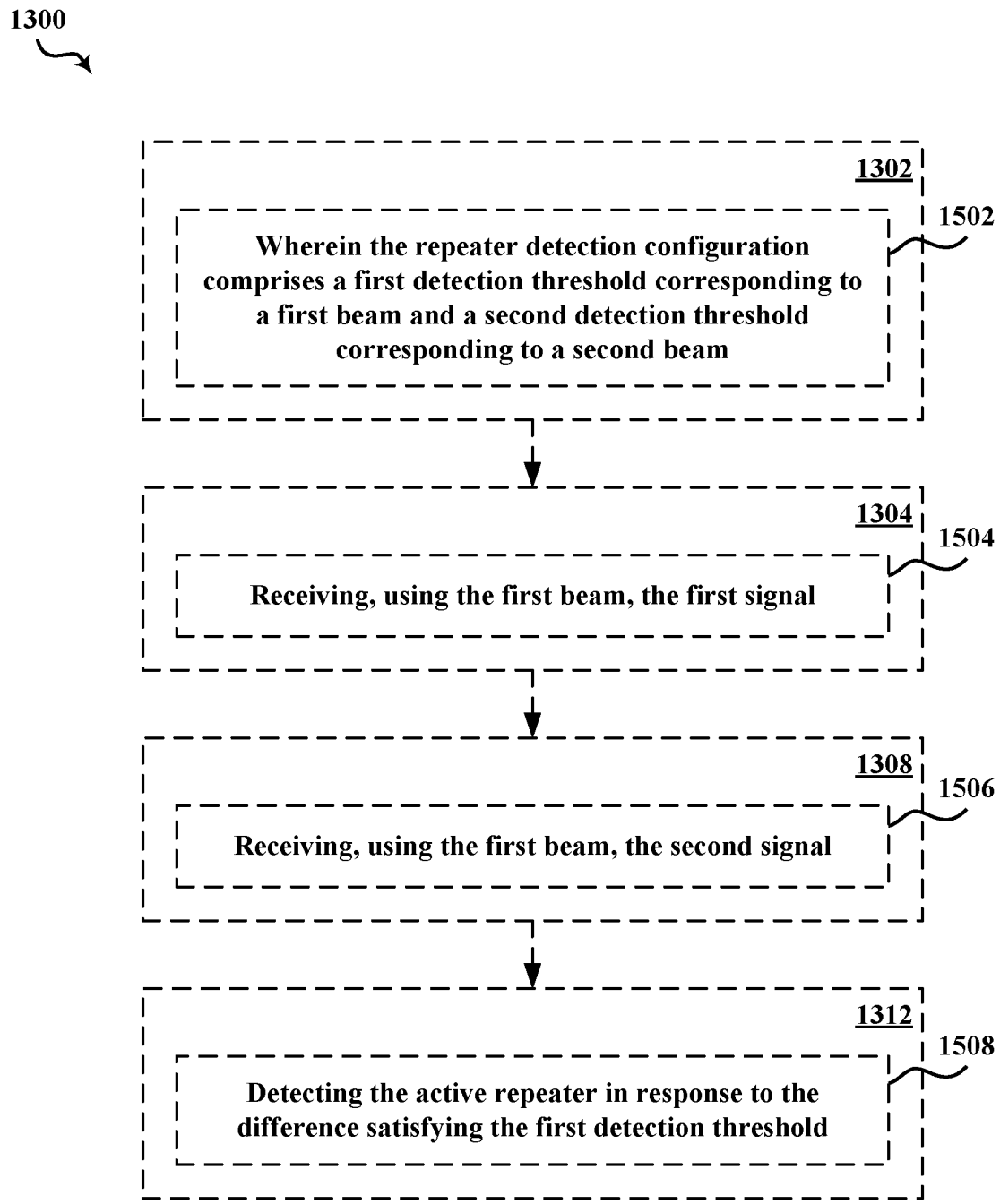
FIG. 15 is a flowchart of second additional or optional steps for the method for detecting a repeater on a propagation path at a receiving device of a wireless communication network in accordance with various aspects of the present disclosure.

Referring to FIG. 15, in an optional or additional aspect that may be combined with any other aspect, at block 1502, the receiving, at block 1302, from the controlling entity, of the repeater detection configuration indicating at least the detection threshold may further include wherein the repeater detection configuration comprises a first detection threshold corresponding to a first beam and a second detection threshold corresponding to a second beam. For example, in an aspect, the receiving device 1200, the processor 1205, the memory 1207, the RX repeater detection component 188, and/or the receiving component 1210 may be configured to or may comprise means for wherein the repeater detection configuration comprises a first detection threshold corresponding to a first beam and a second detection threshold corresponding to a second beam.

For example, the receiving at block 1502 may include receiving, from the controlling entity, the repeater detection configuration comprising the first detection threshold corresponding to the first beam and the second detection threshold corresponding to the second beam. That is, the detection threshold may be beam-specific as described above in reference to FIG. 6.

Further, for example, the receiving at block 1502 may be performed to associate distinct detection thresholds according to the beamforming configuration of the receiving device 1200.

In this optional or additional aspect, at block 1504, the receiving, at block 1304, from the transmitting device via the propagation path, of the first signal having been transmitted at the first power level indicated by the repeater detection configuration may further include receiving, using the first beam, the first signal. For example, in an aspect, the receiving device 1200, the processor 1205, the memory 1207, the RX repeater detection component 188, and/or the receiving component 1210 may be configured to or may comprise means for receiving, using the first beam, the first signal.

For example, the receiving at block 1504 may include receiving, using the first beam, the first signal at the first power level indicated by the one or more different transmit power configurations. In some aspects, the first power level may refer to TRP and/or EIRP.

Further, for example, the receiving at block 1504 may be performed to obtain a signal for performing one or more measurements to determine one or more measured metrics. The one or more measured metrics resulting from the one or more measurements may be compared according to the detection threshold to detect whether the repeater 186 is present in the propagation path.

In this optional or additional aspect, at block 1504, the receiving, at block 1308, from the transmitting device via the propagation path, of the second signal having been transmitted at the second power level indicated by the repeater detection configuration may further comprise receiving, using the first beam, the second signal. For example, in an aspect, the receiving device 1200, the processor 1205, the memory 1207, the RX repeater detection component 188, and/or the receiving component 1210 may be configured to or may comprise means for receiving, using the first beam, the second signal.

For example, the receiving at block 1506 may include receiving, using the first beam, the second signal having been transmitted at the second power level indicated by the one or more different transmit power configurations. In some aspects, the second power level may refer to TRP and/or EIRP.

Further, for example, the receiving at block 1506 may be performed to obtain a second signal for performing one or more measurements to determine one or more measured metrics. The one or more measured metrics resulting from the one or more measurements may be compared according to the detection threshold to detect whether the repeater 186 is present in the propagation path.

In this optional or additional aspect, at block 1508, the detecting, at block 1312, of the active repeater on the propagation path in response to a difference between the first measurement results and the second measurement results satisfying the detection threshold may further include detecting the active repeater on the propagation path in response to the difference satisfying the first detection threshold. For example, in an aspect, the receiving device 1200, the processor 1205, the memory 1207, the RX repeater detection component 188, and/or the detecting component 1220 may be configured to or may comprise means for detecting the active repeater on the propagation path in response to the difference satisfying the first detection threshold.

For example, the detecting at block 1508 may include comparing the first measurement results corresponding to the first beam with the second measurement results corresponding to the first beam to determine a difference between the first measurement results with the second measurement results.

Further, for example, the detecting at block 1508 may be performed to detect whether a repeater 186 is present on the propagation path according to the beamforming configuration.

Figure 16:
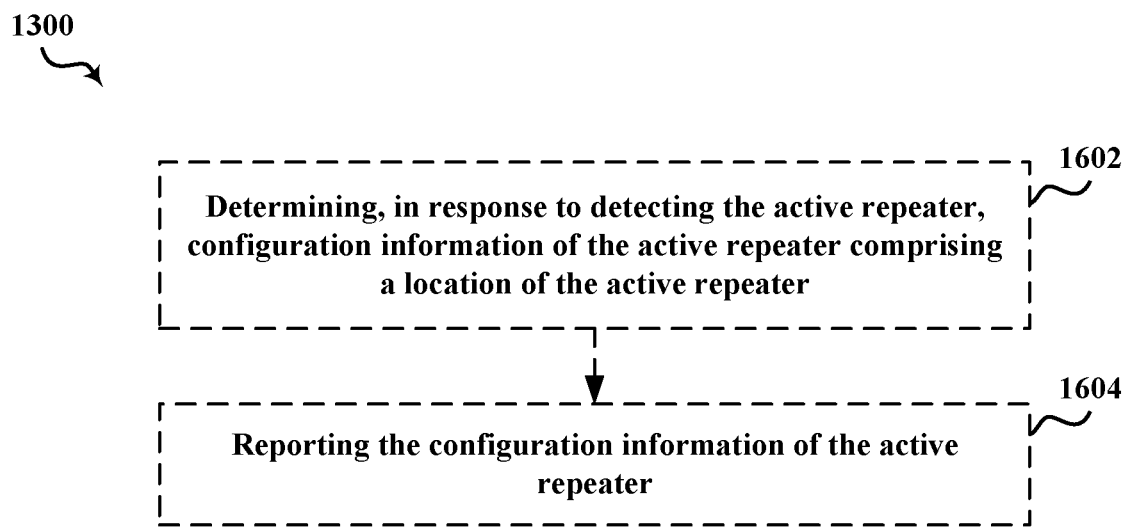
FIG. 16 is a flowchart of third additional or optional steps for the method for detecting a repeater on a propagation path at a receiving device of a wireless communication network in accordance with various aspects of the present disclosure.

Referring to FIG. 16, in an optional or additional aspect that may be combined with any other aspect, at block 1602, the method 1300 may further include determining, in response to detecting the active repeater, configuration information of the active repeater comprising at least one of a location of the active repeater, a power configuration of the active repeater, and an amplification configuration of the active repeater. For example, in an aspect, the receiving device 1200, the processor 1205, the memory 1207, the RX repeater detection component 188, and/or the determining component 1225 may be configured to or may comprise means for determining, in response to detecting the active repeater, configuration information of the active repeater comprising at least one of a location of the active repeater, a power configuration of the active repeater, and an amplification configuration of the active repeater.

For example, the determining at block 1602 may include performing additional measurements to obtain the additional configuration information of the repeater 186. For example, the receiving device 1200 may perform, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

Further, for example, the determining at block 1602 may be performed to obtain additional configuration information of the repeater 186. As such, the receiving device 1200 may configure communications to use the repeater 186 in the propagation path and potentially enhance performance of the receiving device 1200.

In this optional or additional aspect, at block 1604, the method 1300 may further include reporting the configuration information of the active repeater. For example, in an aspect, the receiving device 1200, the processor 1205, the memory 1207, the RX repeater detection component 188, and/or the reporting component 1235 may be configured to or may comprise means for reporting the configuration information of the active repeater.

For example, the reporting at block 1604 may include sending the configuration information to the transmitting device 700. Alternatively or additionally, the reporting at block 1604 may include sending the configuration information to the controlling entity.

Further, for example, the reporting at block 1604 may be performed to indicate the presence and/or configuration of the repeater 186 to the wireless communication system 100.

Figure 17:
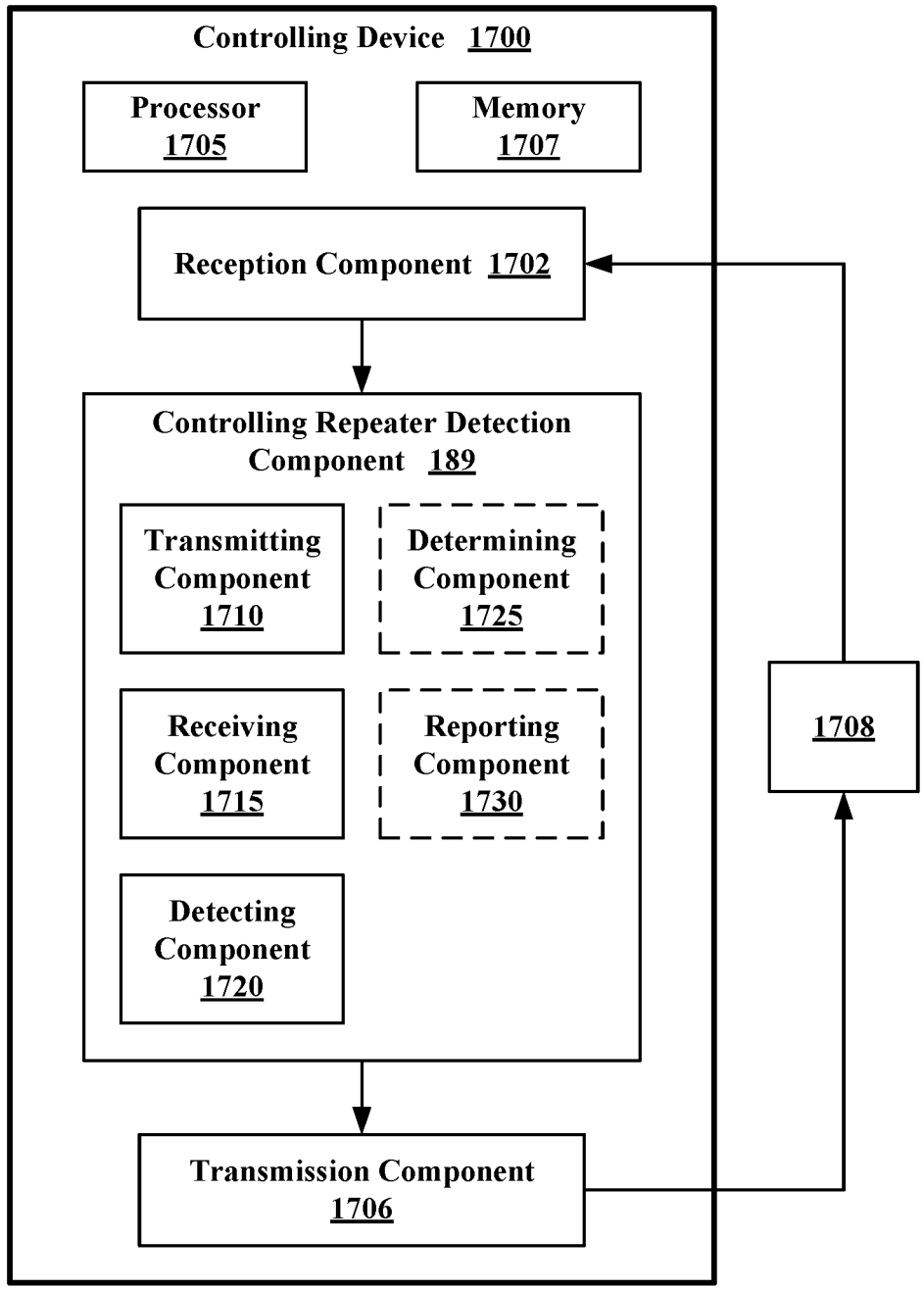
FIG. 17 is a diagram illustrating an example controlling device for detecting a repeater on a propagation path of a wireless communication network, in accordance with various aspects of the present disclosure.

FIG. 17 is a diagram of an example controlling device 1700 for detecting a repeater on a propagation path of a wireless communication network. The controlling device 1700 may be a wireless communication device (e.g., base station 102 and/or UE 104 of FIGS. 1 and 3-6) or the wireless communication device may include the controlling device 1700. In some aspects, the controlling device 1700 may include a reception component 1702 configured to receive wireless communications from another apparatus (e.g., apparatus 1708), a controlling repeater detection component 189 configured to detect a repeater on a propagation path at a transmitting device, a transmission component 1706 configured to transmit wireless communications to another apparatus (e.g., apparatus 1708), and which may be in communication with one another (e.g., via buses or electrical connections). As shown, the controlling device 1700 may be in communication with another apparatus 1708 (such as a base station 102, UE 104, transmitting device, receiving device, or another wireless communication device) using the reception component 1702 and the transmission component 1706.

In some aspects, the controlling device 1700 may be configured to perform one or more operations described herein in connection with FIGS. 1 and 3-6. Alternatively or additionally, the controlling device 1700 may be configured to perform one or more processes described herein, such as method 1800 of FIGS. 18-20, by such as via execution of controlling repeater detection component 189 by processor 1705 and/or memory 1707. The processor 1705 may include or may be similar in many respects to at least one of the RX processor 313, the controller/processor 315, the TX processor 316, the RX processor 353, the controller/processor 355, the TX processor 356 described above with reference to FIG. 3 and may include additional features not mentioned above. Furthermore, the memory 1707 may include or may be similar in many respects to the memory 317 and/or the memory 357 described above with reference to FIG. 3 and may include additional features not mentioned above. In some aspects, the controlling device 1700 may include one or more components of a wireless communication device (e.g., base station 102, UE 104) described above in connection with FIGS. 1 and 3-6.

The reception component 1702 may receive communications, such as reference signals, control information, data communications, or a combination thereof, from the apparatus 1708. The reception component 1702 may provide received communications to one or more other components of the controlling device 1700, such as the controlling repeater detection component 189. In some aspects, the reception component 1702 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1702 may include one or more antennas, a demodulator, a MIMO detector, a receive processor, a controller/processor, a memory, or a combination thereof, of a wireless communication device (e.g., base station 102, UE 104) described above in connection with FIGS. 1 and 3-6.

The transmission component 1706 may transmit communications, such as reference signals, control information, data communications, or a combination thereof, to the apparatus 1708. In some aspects, the controlling repeater detection component 189 may generate communications and may transmit the generated communications to the transmission component 1706 for transmission to the apparatus 1708. In some aspects, the transmission component 1706 may perform signal processing on the generated communications (such as filtering, amplification, modulation, digital-to-analog conversion, multiplexing, interleaving, mapping, or encoding, among other examples), and may transmit the processed signals to the apparatus 1708. In other aspects, the transmission component 1706 may include one or more antennas, a modulator, a transmit MIMO processor, a transmit processor, a controller/processor, a memory, or a combination thereof, of a wireless communication device (e.g., base station 102, UE 104) described above in connection with FIGS. 1 and 3-6. In some aspects, the transmission component 1706 may be co-located with the reception component 1702 in a transceiver or transceiver component.

The controlling repeater detection component 189 may be configured to detect a repeater on a propagation path at a controlling device 1700. In some aspects, the controlling repeater detection component 189 may include a set of components, such as a transmitting component 1710 configured to transmit a repeater detection configuration indicating a detection threshold and at least one transmit power level, a receiving component 1715 configured to receive first measurement results and second measurement results, and a detecting component 1720 configured to detect an active repeater on the propagation path.

In other optional or additional aspects, the controlling repeater detection component 189 may further include a determining component 1725 configured to determine configuration information of the active repeater, and a reporting component 1730 configured to report the configuration information of the active repeater.

Alternatively or additionally, the set of components may be separate and distinct from the controlling repeater detection component 189. In other aspects, one or more components of the set of components may include or may be implemented within a controller/processor (e.g., processor 1705, RX processor 313, controller/processor 315, TX processor 316, RX processor 353, controller/processor 355, TX processor 356), a memory (e.g., memory 1707, memory 317, memory 357), or a combination thereof, of the wireless communication devices (e.g., base station 102, UE 104) described in FIGS. 1 and 3-6. Alternatively or additionally, one or more components of the set of components may be implemented at least in part as software stored in a memory (e.g., memory 1707, memory 317, memory 357). For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIGS. 1 and 3-6.

Figure 18:
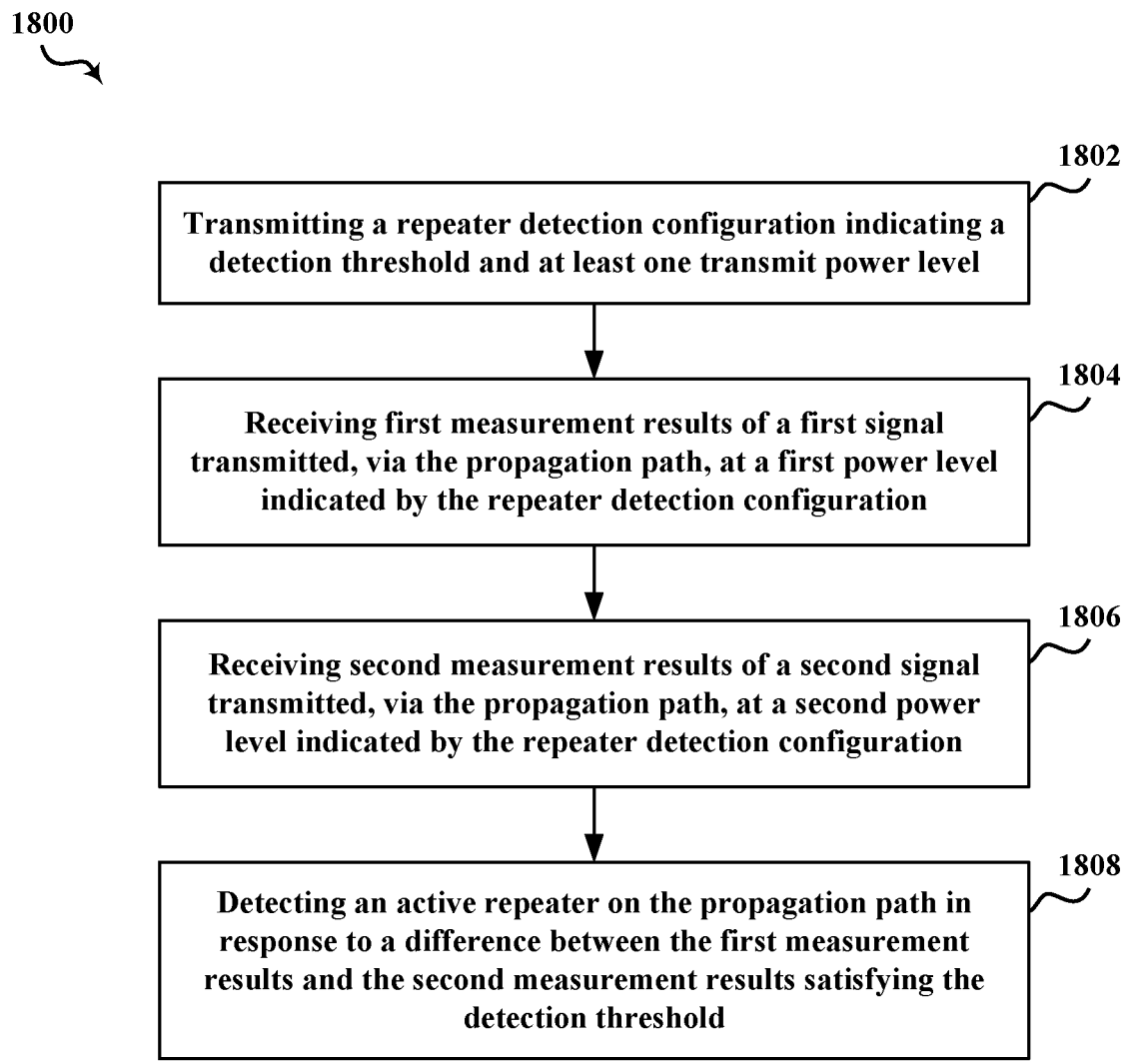
FIG. 18 is a flowchart of a method for detecting a repeater on a propagation path at a controlling device of a wireless communication network, in accordance with various aspects of the present disclosure.
Figure 19:
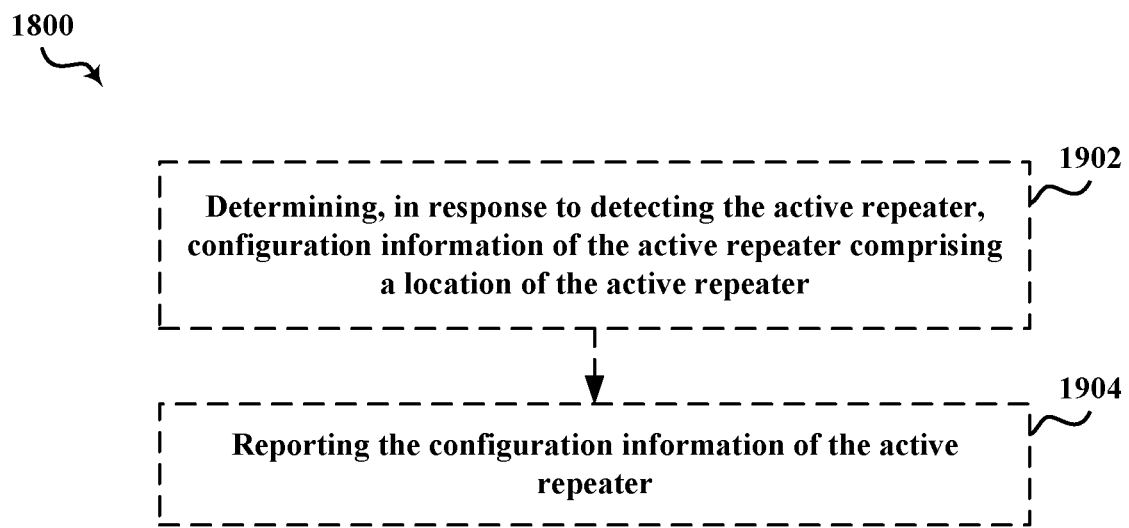
FIG. 19 is a flowchart of first additional or optional steps for the method for detecting a repeater on a propagation path at a controlling device of a wireless communication network in accordance with various aspects of the present disclosure.
Figure 20:
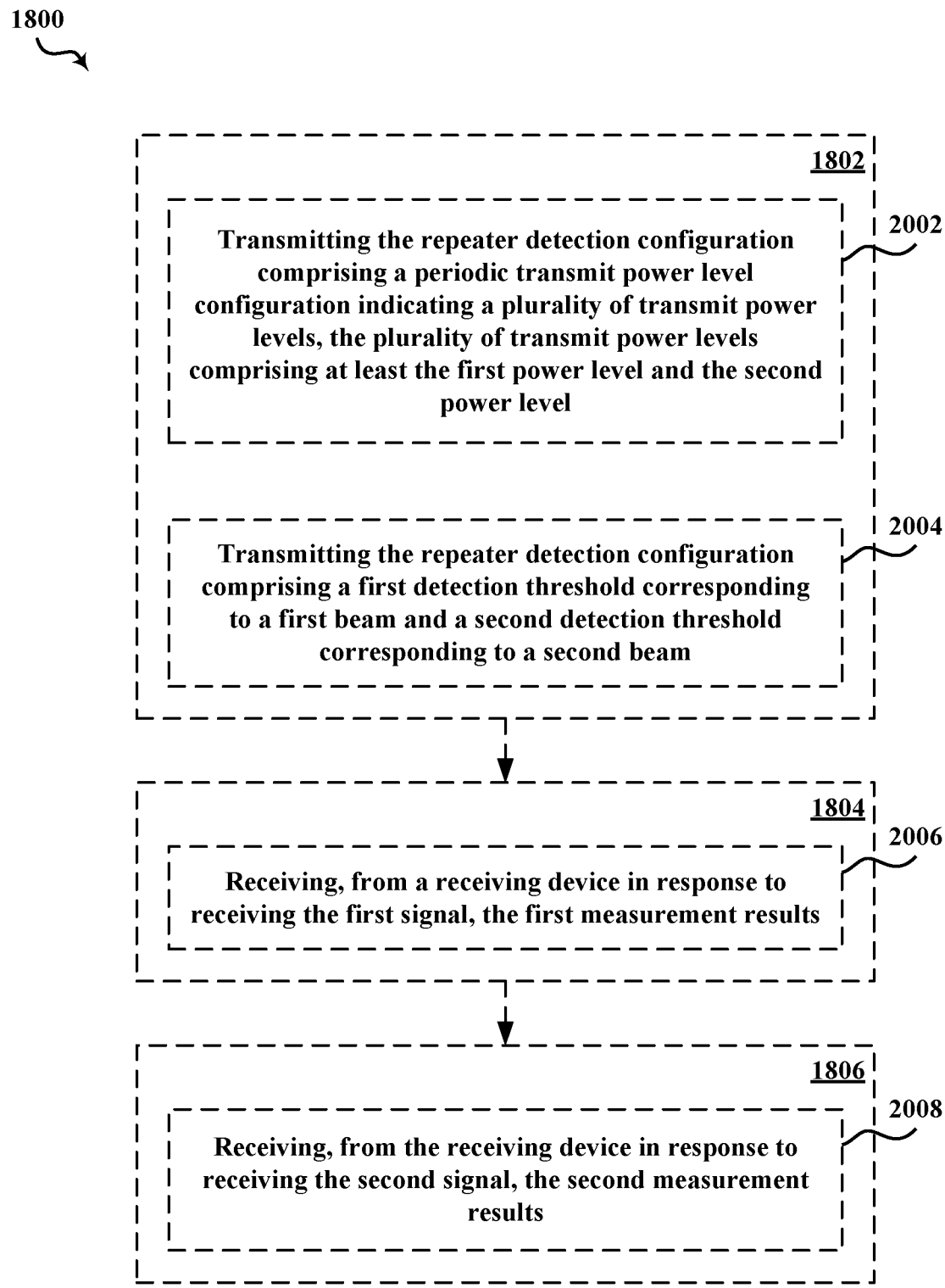
FIG. 20 is a flowchart of second additional or optional steps for the method for detecting a repeater on a propagation path at a controlling device of a wireless communication network in accordance with various aspects of the present disclosure.

Referring to FIGS. 18-20, in operation, a controlling device 1700 may perform a method 1800 of detecting a repeater on a propagation path. The method 1800 may be performed by a wireless communication device (e.g., base station 102 and/or UE 104 of FIGS. 1 and 3-6). The method 1800 may be performed by the controlling repeater detection component 189 in communication with a transmitting device and/or a receiving device.

At block 1802, the method 1800 includes transmitting a repeater detection configuration indicating a detection threshold and at least one transmit power level. For example, in an aspect, the controlling device 1700, the processor 1705, the memory 1707, the controlling repeater detection component 189, and/or the transmitting component 1710 may be configured to or may comprise means for transmitting a repeater detection configuration indicating a detection threshold and at least one transmit power level.

For example, the transmitting at block 1802 may include transmitting, to the transmitting device 700, one or more different transmit power configurations for a given transmit/receive configuration, as described above in reference to FIG. 6. The transmitting device 700 may use the one or more different transmit power configurations to configure transmission of one or more signals used to perform measurements on the propagation path. The one or more different transmit power configurations may comprise a periodic transmit configuration. Alternatively or additionally, the one or more different transmit power configurations may comprise a power ramping configuration. In other aspects, the one or more different transmit power configurations may be configured dynamically or semi-statically/statically.

In some aspects, the transmitting at block 1802 may include transmitting a transmit power level configuration indicating a plurality of transmit power levels. The plurality of transmit power levels may comprise at least the first power level and the second power level. In some aspects, the plurality of transmit power levels may refer to TRP and/or EIRP. Alternatively or additionally, the transmit power level configuration may comprise an SRS configuration.

In other optional or additional aspects, the transmitting at block 1802 may include transmitting the detection threshold. In other aspects, the detection threshold may be beam-specific. That is, the repeater 186 may be detected according to a distinct detection threshold corresponding to a beamforming configuration of the propagation path. Alternatively or additionally, the detection threshold may be a predetermined value.

In other optional or additional aspects, the transmitting device 700 and the controlling device 1700 may be a same device. Alternatively or additionally, the receiving device 1200 and the controlling device 1700 may be a same device.

Further, for example, the transmitting at block 1802 may be performed to configure the transmitting device 700 and the receiving device 1200 to perform measurements on the propagation path according to one or more signals transmitted by the transmitting device. The measured metrics resulting from the measurements may be compared according to the detection threshold to detect whether the repeater 186 is present in the propagation path.

At block 1804, the method 1800 includes receiving first measurement results of a first signal transmitted, via the propagation path, at a first power level indicated by the repeater detection configuration. For example, in an aspect, the controlling device 1700, the processor 1705, the memory 1707, the controlling repeater detection component 189, and/or the receiving component 1715 may be configured to or may comprise means for receiving first measurement results of a first signal transmitted, via the propagation path, at a first power level indicated by the repeater detection configuration.

For example, the receiving at block 1804 may include receiving, from the receiving device 1200, the one or more measured metrics determined by the receiving device by performing the one or more measurements on the first signal. Alternatively or additionally, the one or more measured metrics may be received from the transmitting device 700. The one or more measured metrics may comprise a RSRP, a RSSI, an SNR, and/or a SINR.

Further, for example, the receiving at block 1804 may be performed to collect first measurement results corresponding to the first signal. The first measurement results may be compared, according to the detection threshold, with second measurement results corresponding to a second signal to detect whether the repeater 186 is present on the propagation path.

At block 1806, the method 1800 includes receiving second measurement results of a second signal transmitted, via the propagation path, at a second power level indicated by the repeater detection configuration. For example, in an aspect, the controlling device 1700, the processor 1705, the memory 1707, the controlling repeater detection component 189, and/or the receiving component 1715 may be configured to or may comprise means for receiving second measurement results of a second signal transmitted, via the propagation path, at a second power level indicated by the repeater detection configuration.

For example, the receiving at block 1806 may include receiving, from the receiving device 1200, the one or more measured metrics determined by the receiving device by performing the one or more measurements on the second signal. Alternatively or additionally, the one or more measured metrics may be received from the transmitting device 700. The one or more measured metrics may comprise a RSRP, a RSSI, an SNR, and/or a SINR.

Further, for example, the receiving at block 1806 may be performed to collect second measurement results corresponding to the second signal. The second measurement results may be compared, according to the detection threshold, with first measurement results corresponding to the first signal to detect whether the repeater 186 is present on the propagation path.

At block 1808, the method 1800 includes detecting an active repeater on the propagation path in response to a difference between the first measurement results and the second measurement results satisfying the detection threshold. For example, in an aspect, the controlling device 1700, the processor 1705, the memory 1707, the controlling repeater detection component 189, and/or the detecting component 1720 may be configured to or may comprise means for detecting an active repeater on the propagation path in response to a difference between the first measurement results and the second measurement results satisfying the detection threshold.

For example, the detecting at block 1808 may include comparing the first measurement results with the second measurement results to determine a difference between the first measurement results with the second measurement results.

In some aspects, the detecting at block 1808 may include detecting the repeater 186 according to the difference between the first measurement results with the second measurement results. For example, the detecting at block 1808 may include detecting the presence of the repeater 186 if or when the difference of the measured metrics satisfies the detection threshold. That is, if or when the difference between the first measurement results with the second measurement results does not exceed the detection threshold, the detecting at block 1808 may include determining that the repeater 186 is present on the propagation path. Alternatively or additionally, the detecting at block 1808 may include not detecting the presence of the repeater 186 if or when the difference of the measured metrics does not satisfy the detection threshold. That is, if or when the difference between the first measurement results with the second measurement results exceeds the detection threshold, the detecting at block 1808 may include determining that the repeater 186 is not present on the propagation path.

Further, for example, the detecting at block 1808 may be performed to detect whether a repeater 186 is present on the propagation path. If or when the presence of the repeater 186 is detected by the controlling device 1700, the controlling device 1700 may, in response, adjust at least one of interference management, beam management, positioning, and mobility management, and, as such improve positioning accuracy and performance of the controlling device 1700.

Referring to FIG. 19, in an optional or additional aspect that may be combined with any other aspect, at block 1902, the method 1800 may further include determining, in response to detecting the active repeater, configuration information of the active repeater comprising at least one of a location of the active repeater, a power configuration of the active repeater, and an amplification configuration of the active repeater. For example, in an aspect, the controlling device 1700, the processor 1705, the memory 1707, the controlling repeater detection component 189, and/or the determining component 1725 may be configured to or may comprise means for determining, in response to detecting the active repeater, configuration information of the active repeater comprising at least one of a location of the active repeater, a power configuration of the active repeater, and an amplification configuration of the active repeater.

For example, the determining at block 1902 may include obtaining additional measurements to determine the additional configuration information of the repeater 186. For example, the controlling device 1700 may obtain, in response to a determination that the repeater 186 is detected in the propagation path, additional measurements using additional transmit power configurations and/or additional beamforming configurations to determine a direction of the repeater 186, a location of the repeater 186, a power amplification configuration of the repeater 186, and/or an amplification configuration of the repeater 186.

Further, for example, the determining at block 1902 may be performed to obtain additional configuration information of the repeater 186. As such, the controlling device 1700 may configure communications to use the repeater 186 in the propagation path and potentially enhance performance of the controlling device 1700.

In this optional or additional aspect, at block 1904, the method 1800 may further include reporting the configuration information of the active repeater. For example, in an aspect, the controlling device 1700, the processor 1705, the memory 1707, the controlling repeater detection component 189, and/or the reporting component 1730 may be configured to or may comprise means for reporting the configuration information of the active repeater.

For example, the reporting at block 1904 may include sending the configuration information to the transmitting device 700. Alternatively or additionally, the reporting at block 1604 may include sending the configuration information to the receiving device 1200.

Further, for example, the reporting at block 1904 may be performed to indicate the presence and/or configuration of the repeater 186 to the wireless communication system 100.

Referring to FIG. 20, in an optional or additional aspect that may be combined with any other aspect, at block 2002, the transmitting, at block 1802, of a repeater detection configuration indicating a detection threshold and at least one transmit power level may further include transmitting the repeater detection configuration comprising a transmit power level configuration indicating a plurality of transmit power levels, the plurality of transmit power levels comprising at least the first power level and the second power level. For example, in an aspect, the controlling device 1700, the processor 1705, the memory 1707, the controlling repeater detection component 189, and/or the transmitting component 1710 may be configured to or may comprise means for transmitting the repeater detection configuration comprising a transmit power level configuration indicating a plurality of transmit power levels, the plurality of transmit power levels comprising at least the first power level and the second power level.

For example, the transmitting at block 2002 may include transmitting, to the transmitting device 700, a transmit power level configuration indicating a plurality of transmit power levels. The plurality of transmit power levels may comprise at least the first power level and the second power level. In some aspects, the plurality of transmit power levels may refer to TRP and/or EIRP. Alternatively or additionally, the transmit power level configuration may comprise an SRS configuration.

Further, for example, the transmitting at block 2002 may be performed to configure the transmitting device 700 and the receiving device 1200 to perform measurements on the propagation path according to one or more signals transmitted by the transmitting device. The measured metrics resulting from the measurements may be compared according to the detection threshold to detect whether the repeater 186 is present in the propagation path.

In this optional or additional aspect, at block 2004, the transmitting, at block 1802, of a repeater detection configuration indicating a detection threshold and at least one transmit power level may further include transmitting the repeater detection configuration comprising a first detection threshold corresponding to a first beam and a second detection threshold corresponding to a second beam. For example, in an aspect, the controlling device 1700, the processor 1705, the memory 1707, the controlling repeater detection component 189, and/or the transmitting component 1710 may be configured to or may comprise means for transmitting the repeater detection configuration comprising a first detection threshold corresponding to a first beam and a second detection threshold corresponding to a second beam.

For example, the transmitting at block 2004 may include transmitting, to the transmitting device 700 and/or to the receiving device 1200, the repeater detection configuration comprising the first detection threshold corresponding to the first beam and the second detection threshold corresponding to the second beam. That is, the detection threshold may be beam-specific as described above in reference to FIG. 6.

Further, for example, the transmitting at block 2004 may be performed to associate distinct detection thresholds according to the beamforming configuration of the transmitting device 700 and of the receiving device 1200.

In this optional or additional aspect, at block 2006, the receiving, at block 1804, of the first measurement results of the first signal transmitted, via the propagation path, at the first power level indicated by the repeater detection configuration may further include receiving, from a receiving device in response to receiving the first signal, the first measurement results. For example, in an aspect, the controlling device 1700, the processor 1705, the memory 1707, the controlling repeater detection component 189, and/or the receiving component 1715 may be configured to or may comprise means for receiving, from a receiving device in response to receiving the first signal, the first measurement results.

For example, the receiving at block 2006 may include receiving, from the receiving device 1200, the one or more measured metrics determined by the receiving device 1200 by performing the one or more measurements on the first signal.

Alternatively or additionally, the receiving at block 2006 may include receiving, from the transmitting device 700, the one or more measured metrics determined by the receiving device 1200.

Further, for example, the receiving at block 2006 may be performed to collect first measurement results corresponding to the first signal. The first measurement results may be compared, according to the detection threshold, with second measurement results corresponding to a second signal. The controlling device 1700 may detect whether the repeater 186 is present on the propagation path according to the comparison of the first measurement results and the second measurement results.

In this optional or additional aspect, at block 2008, the receiving, at block 1806, of the second measurement results of the second signal transmitted, via the propagation path, at the second power level indicated by the repeater detection configuration may further include receiving, from the receiving device in response to receiving the second signal, the second measurement results. For example, in an aspect, the controlling device 1700, the processor 1705, the memory 1707, the controlling repeater detection component 189, and/or the receiving component 1715 may be configured to or may comprise means for receiving, from the receiving device in response to receiving the second signal, the second measurement results.

For example, the receiving at block 2008 may include receiving, from the receiving device 1200, the one or more measured metrics determined by the receiving device 1200 by performing the one or more measurements on the second signal.

Alternatively or additionally, the receiving at block 2008 may include receiving, from the transmitting device 700, the one or more measured metrics determined by the receiving device 1200.

Further, for example, the receiving at block 2008 may be performed to collect second measurement results corresponding to the second signal. The second measurement results may be compared, according to the detection threshold, with the first measurement results corresponding to the first signal. The controlling device 1700 may detect whether the repeater 186 is present on the propagation path according to the comparison of the first measurement results and the second measurement results.

Implementation examples are described in the following numbered clauses:

1. A method of detecting a repeater on a propagation path at a transmitting device of a wireless communication network, comprising:
   receiving, from a controlling entity, a repeater detection configuration indicating a detection threshold and at least one transmit power level;
   transmitting, to a receiving device via the propagation path and according to the repeater detection configuration, a first signal at a first power level;
   receiving, in response to transmitting the first signal, first measurement results of the first signal;
   transmitting, to the receiving device via the propagation path and according to the repeater detection configuration, a second signal at a second power level, the second power level being different than the first power level;
   receiving, in response to transmitting the second signal, second measurement results of the second signal; and
   detecting an active repeater on the propagation path in response to a difference between the first measurement results and the second measurement results satisfying the detection threshold.
2. The method of clause 1, wherein the transmitting device and the receiving device are a same device.
3. The method of clause 1 or 2, wherein the first measurement results and the second measurement results comprise at least one of a RSRP, RSSI, SNR, SINR.
4. The method of any preceding clause 1 to 3, further comprising: determining, in response to detecting the active repeater, configuration information of the active repeater; and
   communicating, via the active repeater and according to the configuration information, at least one transmission.
5. The method of any preceding clause 1 to 4, further comprising:
   performing, according to the configuration information of the active repeater and in response to detecting the active repeater, at least one of interference management, beam management, positioning, and mobility management.
6. The method of any preceding clause 1 to 5, wherein the repeater detection configuration comprises a transmit power level configuration indicating a plurality of transmit power levels, the plurality of transmit power levels comprising at least the first power level and the second power level.
7. The method of any preceding clause 1 to 6, wherein the transmit power level configuration comprises a SRS configuration.
8. The method of any preceding clause 1 to 7, wherein the repeater detection configuration comprises a first detection threshold corresponding to a first beam and a second detection threshold corresponding to a second beam;
   wherein transmitting the first signal comprises transmitting, using the first beam, the first signal at the first power level;
   wherein transmitting the second signal comprises transmitting, using the first beam, the second signal at the second power level; and
   wherein detecting the active repeater on the propagation path in response to the difference between the first measurement results and the second measurement results satisfying the detection threshold comprises detecting the active repeater on the propagation path in response to the difference satisfying the first detection threshold.
9. The method of any preceding clause 1 to 8, further comprising:
   determining, in response to detecting the active repeater, configuration information of the active repeater comprising at least one of a location of the active repeater, a power configuration of the active repeater, and an amplification configuration of the active repeater; and
   reporting the configuration information of the active repeater.
10. An apparatus for detecting a repeater on a propagation path at a transmitting device of a wireless communication network, comprising a memory storing instructions, and a processor communicatively coupled with the memory and configured to execute the instructions to perform one or more methods of any preceding clause 1 to 9.
11. An apparatus for detecting a repeater on a propagation path at a transmitting device of a wireless communication network, comprising means for performing one or more methods of any preceding clause 1 to 9.
12. A computer-readable medium storing instructions for detecting a repeater on a propagation path at a transmitting device of a wireless communication network, executable by a processor, to perform one or more methods of any preceding clause 1 to 9.
13. A method of detecting a repeater on a propagation path at a receiving device of a wireless communication network, comprising:
   receiving, from a controlling entity, a repeater detection configuration indicating at least a detection threshold;
   receiving, from a transmitting device via the propagation path, a first signal having been transmitted at a first power level indicated by the repeater detection configuration;
   performing first measurements of the first signal resulting in first measurement results;
   receiving, from the transmitting device via the propagation path, a second signal having been transmitted at a second power level indicated by the repeater detection configuration;
   performing second measurements of the second signal resulting in second measurement results; and
   detecting an active repeater on the propagation path in response to a difference between the first measurement results and the second measurement results satisfying the detection threshold.
14. The method of clause 13, wherein the transmitting device and the receiving device are a same device.
15. The method of clause 13 or 14, wherein the first measurement results and the second measurement results comprise at least one of a RSRP, RSSI, SNR, SINR.
16. The method of any preceding clause 13 to 15, further comprising:

determining, in response to detecting the active repeater, configuration information of the active repeater; and communicating, via the active repeater and according to the configuration information, at least one transmission.

17. The method of any preceding clause 13 to 16, further comprising:

performing, according to the configuration information of the active repeater and in response to detecting the active repeater, at least one of interference management, beam management, positioning, and mobility management.

18. The method of any preceding clause 13 to 17, further comprising:

transmitting, to the transmitting device in response to receiving the first signal, the first measurement results; and transmitting, to the transmitting device in response to receiving the second signal, the second measurement results;

19. The method of any preceding clause 13 to 18, wherein the repeater detection configuration comprises a first detection threshold corresponding to a first beam and a second detection threshold corresponding to a second beam;

wherein receiving the first signal comprises receiving, using the first beam, the first signal;

wherein receiving the second signal comprises receiving, using the first beam, the second signal; and wherein detecting the active repeater on the propagation path in response to the difference between the first measurement results and the second measurement results satisfying the detection threshold comprises detecting the active repeater in response to the difference satisfying the first detection threshold.

20. The method of any preceding clause 13 to 19, further comprising:

determining, in response to detecting the active repeater, configuration information of the active repeater comprising at least one of a location of the active repeater, a power configuration of the active repeater, and an amplification configuration of the active repeater; and reporting the configuration information of the active repeater.

21. An apparatus for detecting a repeater on a propagation path at a receiving device of a wireless communication network, comprising a memory storing instructions, and a processor communicatively coupled with the memory and configured to execute the instructions to perform one or more methods of any preceding clause 13 to 20.

22. An apparatus for detecting a repeater on a propagation path at a receiving device of a wireless communication network, comprising means for performing one or more methods of any preceding clause 13 to 20.

23. A computer-readable medium storing instructions for detecting a repeater on a propagation path at a receiving device of a wireless communication network, executable by a processor, to perform one or more methods of any preceding clause 13 to 20.

24. A method of detecting a repeater on a propagation path at a controlling entity of a wireless communication network, comprising:

transmitting a repeater detection configuration indicating a detection threshold and at least one transmit power level;

receiving first measurement results of a first signal transmitted, via the propagation path, at a first power level indicated by the repeater detection configuration;

receiving second measurement results of a second signal transmitted, via the propagation path, at a second power level indicated by the repeater detection configuration; and detecting an active repeater on the propagation path in response to a difference between the first measurement results and the second measurement results satisfying the detection threshold.

25. The method of clause 24, wherein the first measurement results and the second measurement results comprise at least one of a RSRP, RSSI, SNR, SINR.

26. The method of clause or 25, further comprising:

determining, in response to detecting the active repeater, configuration information of the active repeater comprising at least one of a location of the active repeater, a power configuration of the active repeater, and an amplification configuration of the active repeater; and reporting the configuration information of the active repeater.

27. The method of any preceding clause 24 to 26, wherein receiving the first measurement results of the first signal comprises receiving, from a receiving device in response to receiving the first signal, the first measurement results; and wherein receiving the second measurement results of the second signal comprises receiving, from the receiving device in response to receiving the second signal, the second measurement results.

28. The method of any preceding clause 24 to 27, wherein transmitting the repeater detection configuration comprises:

transmitting the repeater detection configuration comprising a transmit power level configuration indicating a plurality of transmit power levels, the plurality of transmit power levels comprising at least the first power level and the second power level.

29. The method of any preceding clause 24 to 28, wherein transmitting the repeater detection configuration comprises:

transmitting the repeater detection configuration comprising a first detection threshold corresponding to a first beam and a second detection threshold corresponding to a second beam.

30. An apparatus for detecting a repeater on a propagation path at a controlling entity of a wireless communication network, comprising a memory storing instructions, and a processor communicatively coupled with the memory and configured to execute the instructions to perform one or more of methods of any preceding clause 24 to 29.

31. An apparatus for detecting a repeater on a propagation path at a controlling entity of a wireless communication network, comprising means for performing one or more of methods of any preceding clause 24 to 29.

32. A computer-readable medium storing instructions for detecting a repeater on a propagation path at a controlling entity of a wireless communication network, executable by a processor, to perform one or more of the methods of any preceding clause 24 to 29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of detecting a repeater on a propagation path at a transmitting device of a wireless communication network, comprising:

receiving, from a controlling entity, a repeater detection configuration indicating a detection threshold and at least one transmit power level;
transmitting, to a receiving device via the propagation path and according to the repeater detection configuration, a first signal at a first power level;
receiving, in response to transmitting the first signal, first measurement results of the first signal;
transmitting, to the receiving device via the propagation path and according to the repeater detection configuration, a second signal at a second power level, the second power level being different than the first power level;
receiving, in response to transmitting the second signal, second measurement results of the second signal;
detecting an active repeater on the propagation path in response to a difference between the first measurement results and the second measurement results satisfying the detection threshold;
determining, in response to detecting the active repeater, configuration information of the active repeater;
performing, according to the configuration information of the active repeater and in response to detecting the active repeater, at least one of interference management, beam management, positioning, or mobility management;
and
communicating at least one transmission via the active repeater and according to the configuration information of the active repeater.

2. The method of claim 1, wherein the transmitting device and the receiving device are a same device.

3. The method of claim 1, wherein the first measurement results and the second measurement results comprise at least one of a reference signal received power (RSRP), received signal strength indicator (RSSI), signal-to-noise ratio (SNR), and signal-to-interference-plus-noise ratio (SINR).

4. The method of claim 1, wherein the repeater detection configuration comprises a transmit power level configuration indicating a plurality of transmit power levels, the plurality of transmit power levels comprising at least the first power level and the second power level.

5. The method of claim 4, wherein the transmit power level configuration comprises a sounding reference signal (SRS) configuration.

6. The method of claim 1,
wherein the repeater detection configuration comprises a first detection threshold corresponding to a first beam and a second detection threshold corresponding to a second beam;
wherein transmitting the first signal comprises transmitting, using the first beam, the first signal at the first power level;
wherein transmitting the second signal comprises transmitting, using the first beam, the second signal at the second power level; and
wherein detecting the active repeater on the propagation path in response to the difference between the first measurement results and the second measurement results satisfying the detection threshold comprises detecting the active repeater on the propagation path in response to the difference satisfying the first detection threshold.

7. The method of claim 1, further comprising:
determining, in response to detecting the active repeater, configuration information of the active repeater comprising at least one of a location of the active repeater, a power configuration of the active repeater, and an amplification configuration of the active repeater; and reporting the configuration information of the active repeater.

8. An apparatus for detecting a repeater on a propagation path at a transmitting device of a wireless communication network, comprising:

memory storing instructions; and a processor in communication with the memory and configured to execute the instructions to:

receive, from a controlling entity, a repeater detection configuration indicating a detection threshold and at least one transmit power level;

transmit, to a receiving device via the propagation path and according to the repeater detection configuration, a first signal at a first power level;

receive, in response to transmitting the first signal, first measurement results of the first signal;

transmit, to the receiving device via the propagation path and according to the repeater detection configuration, a second signal at a second power level, the second power level being different than the first power level;

receive, in response to transmitting the second signal, second measurement results of the second signal;

detect an active repeater on the propagation path in response to a difference between the first measurement results and the second measurement results satisfying the detection threshold;

determine, in response to detecting the active repeater, configuration information of the active repeater;

perform, according to the configuration information of the active repeater and in response to detecting the active repeater, at least one of interference management, beam management, positioning, or mobility management;

and communicate at least one transmission via the active repeater and according to the configuration information of the active repeater.

9. The apparatus of claim 8, wherein the transmitting device and the receiving device are a same device.

10. The apparatus of claim 8, wherein the repeater detection configuration comprises a transmit power level configuration indicating a plurality of transmit power levels, the plurality of transmit power levels comprising at least the first power level and the second power level.

11. The apparatus of claim 8, wherein the repeater detection configuration comprises a first detection threshold corresponding to a first beam and a second detection threshold corresponding to a second beam;

wherein to transmit the first signal comprises transmitting, using the first beam, the first signal at the first power level;

wherein to transmit the second signal comprises transmitting, using the first beam, the second signal at the second power level; and wherein to detect the active repeater on the propagation path in response to the difference between the first measurement results and the second measurement results satisfying the detection threshold comprises detecting the active repeater on the propagation path in response to the difference satisfying the first detection threshold.

12. The apparatus of claim 8, wherein the processor is configured to execute further instructions to:

determine, in response to detecting the active repeater, configuration information of the active repeater comprising at least one of a location of the active repeater, a power configuration of the active repeater, and an amplification configuration of the active repeater; and report the configuration information of the active repeater.

13. A method of detecting a repeater on a propagation path at a receiving device of a wireless communication network, comprising:

receiving, from a controlling entity, a repeater detection configuration indicating at least a detection threshold;

receiving, from a transmitting device via the propagation path, a first signal having been transmitted at a first power level indicated by the repeater detection configuration;

performing first measurements of the first signal resulting in first measurement results;

receiving, from the transmitting device via the propagation path, a second signal having been transmitted at a second power level indicated by the repeater detection configuration;

performing second measurements of the second signal resulting in second measurement results;

detecting an active repeater on the propagation path in response to a difference between the first measurement results and the second measurement results satisfying the detection threshold;

determining, in response to detecting the active repeater, configuration information of the active repeater;

performing, according to the configuration information of the active repeater and in response to detecting the active repeater, at least one of interference management, beam management, positioning, or mobility management;

and communicating at least one transmission via the active repeater and according to the configuration information of the active repeater.

14. The method of claim 13, wherein the transmitting device and the receiving device are a same device.

15. The method of claim 13, wherein the first measurement results and the second measurement results comprise at least one of a reference signal received power (RSRP), received signal strength indicator (RSSI), signal-to-noise ratio (SNR), and signal-to-interference-plus-noise ratio (SINR).

16. The method of claim 13, further comprising:

transmitting, to the transmitting device in response to receiving the first signal, the first measurement results; and transmitting, to the transmitting device in response to receiving the second signal, the second measurement results.

17. The method of claim 13, wherein the repeater detection configuration comprises a first detection threshold corresponding to a first beam and a second detection threshold corresponding to a second beam;

wherein receiving the first signal comprises receiving, using the first beam, the first signal;

wherein receiving the second signal comprises receiving, using the first beam, the second signal; and wherein detecting the active repeater on the propagation path in response to the difference between the first measurement results and the second measurement results satisfying the detection threshold comprises detecting the active repeater in response to the difference satisfying the first detection threshold.

18. The method of claim 13, further comprising:

determining, in response to detecting the active repeater, configuration information of the active repeater comprising at least one of a location of the active repeater, a power configuration of the active repeater, and an amplification configuration of the active repeater; and reporting the configuration information of the active repeater.

* * * * *